United States Patent
Warren et al.

(10) Patent No.: US 10,743,731 B2
(45) Date of Patent: Aug. 18, 2020

(54) VACUUM FILTER

(71) Applicant: TTI (Macao Commercial Offshore) Limited, Macau (MO)

(72) Inventors: Robert Patrick Warren, Charlotte, NC (US); Roderick Burgess, Charlotte, NC (US); Joseph M. Lehman, New Albany, OH (US); Garry Fee, Huntersville, NC (US); Michael Bloom, Charlotte, NC (US); William Jacob Kozlowski, Jr., Waxhaw, NC (US); Steven Marcus, Charlotte, NC (US)

(73) Assignee: TTI (Macao Commercial Offshore) Limited, Praia Grande (MO)

( * ) Notice: Subject to any disclaimer, the term of this patent is extended or adjusted under 35 U.S.C. 154(b) by 231 days.

(21) Appl. No.: 15/488,065

(22) Filed: Apr. 14, 2017

(65) Prior Publication Data
US 2017/0296013 A1 Oct. 19, 2017

Related U.S. Application Data

(60) Provisional application No. 62/457,543, filed on Feb. 10, 2017, provisional application No. 62/457,329, (Continued)

(51) Int. Cl.
*B01D 46/02* (2006.01)
*A47L 9/14* (2006.01)
(Continued)

(52) U.S. Cl.
CPC .............. *A47L 5/24* (2013.01); *A47L 9/12* (2013.01); *A47L 9/14* (2013.01); *A47L 9/1454* (2013.01);
(Continued)

(58) Field of Classification Search
CPC B01D 46/02; B01D 46/0005; B01D 46/0001; B01D 2275/20; B01D 2279/55;
(Continued)

(56) References Cited

U.S. PATENT DOCUMENTS 2,543,556 A 2/1951 Senne
2,564,467 A 8/1951 Cranmer
(Continued)

FOREIGN PATENT DOCUMENTS

AU 2011265411 7/2012
CH 408311 2/1966
(Continued)

OTHER PUBLICATIONS

International Search Report Report and Written Opinion for Application No. PCT/US2017/027684 dated Aug. 22, 2017 (19 pages).
(Continued)

*Primary Examiner* — Minh Chau T Pham
(74) *Attorney, Agent, or Firm* — Michael Best & Friedrich LLP

(57) ABSTRACT

A filter configured to separate debris from a flow of fluid. The filter includes a housing and a filter media coupled to the housing to form a collection container. The collection container is configured to store debris separated by the filter media from a flow of fluid. The filter further includes an inlet opening that extends through the housing to provide fluid communication into the collection container such that the flow of fluid with the debris can flow into the collection container and a relatively clean flow of fluid exits through the filter media. The filter further includes an attachment member that couples the filter media to the housing.

39 Claims, 22 Drawing Sheets

Related U.S. Application Data filed on Feb. 10, 2017, provisional application No. 62/361,718, filed on Jul. 13, 2016, provisional application No. 62/323,384, filed on Apr. 15, 2016.

(51) Int. Cl.

| | |
|---|---|
| *A47L 5/24* | (2006.01) |
| *A47L 9/16* | (2006.01) |
| *A47L 11/40* | (2006.01) |
| *B01D 46/00* | (2006.01) |
| *B01D 46/42* | (2006.01) |
| *A47L 9/12* | (2006.01) |
| *A47L 9/28* | (2006.01) |
| *A47L 9/32* | (2006.01) |
| *B01D 46/52* | (2006.01) |

(52) U.S. Cl.
CPC .......... *A47L 9/1481* (2013.01); *A47L 9/1683* (2013.01); *A47L 9/2842* (2013.01); *A47L 9/2857* (2013.01); *A47L 9/2884* (2013.01); *A47L 9/322* (2013.01); *A47L 11/4075* (2013.01); *B01D 46/0001* (2013.01); *B01D 46/0005* (2013.01); *B01D 46/0089* (2013.01); *B01D 46/02* (2013.01); *B01D 46/42* (2013.01); *B01D 46/4227* (2013.01); *B01D 46/4254* (2013.01); *B01D 46/4272* (2013.01); *B01D 46/521* (2013.01); *B01D 2275/203* (2013.01); *B01D 2279/55* (2013.01)

(58) Field of Classification Search
CPC ........ A47L 9/1683; A47L 9/1454; A47L 9/14; A47L 9/1481
USPC ......... 55/334, 361, 367, 368, 376, 377, 380, 55/381, DIG. 2; 15/347, 352, 353, 15/DIG. 8
See application file for complete search history.

(56) References Cited

U.S. PATENT DOCUMENTS

| | | | |
|---|---|---|---|
| 2,615,531 A | 10/1952 | Allen | |
| 2,729,303 A | 1/1956 | McMahan | |
| 2,804,167 A * | 8/1957 | Seck | A47L 9/1445 55/367 |
| 3,369,348 A | 2/1968 | Davis | |
| 3,447,689 A | 6/1969 | Solymar | |
| 3,559,381 A * | 2/1971 | Fesco | A47L 9/14 383/120 |
| 3,618,981 A * | 11/1971 | Leising | B60R 21/2346 102/531 |
| 3,789,589 A * | 2/1974 | Delany | B01D 46/0005 55/481 |
| 3,907,530 A * | 9/1975 | Fesco | A47L 9/14 29/53 |
| 3,973,936 A * | 8/1976 | Howard | A47L 9/14 55/363 |
| 4,073,632 A | 2/1978 | Reinauer et al. | |
| 4,276,069 A | 6/1981 | Miller | |
| D277,516 S | 2/1985 | Hayden et al. | |
| D304,250 S | 10/1989 | Hassel et al. | |
| 6,029,309 A | 3/2000 | Imamura | |
| 6,058,560 A | 5/2000 | Gab et al. | |
| 6,237,648 B1 | 5/2001 | Busacca et al. | |
| 6,256,834 B1 | 7/2001 | Meijer et al. | |
| D449,138 S | 10/2001 | Dodson et al. | |
| 6,571,422 B1 | 6/2003 | Gordon et al. | |
| 6,871,679 B2 | 3/2005 | Last | |
| 7,143,467 B2 | 12/2006 | Seith | |
| D544,347 S | 6/2007 | Last | |
| 7,237,298 B2 | 7/2007 | Reindle et al. | |
| 7,254,865 B2 | 8/2007 | Bosses | |
| D551,078 S | 9/2007 | Last | |
| 7,310,854 B2 | 12/2007 | Nam et al. | |
| 7,325,272 B2 | 2/2008 | Bosses | |
| 7,424,766 B2 | 9/2008 | Reindle et al. | |
| 7,468,083 B2 | 12/2008 | Davis et al. | |
| 7,509,707 B2 | 3/2009 | Pullins | |
| 7,599,758 B2 | 10/2009 | Reindle et al. | |
| 7,673,368 B2 | 3/2010 | Cloud, III | |
| 7,770,253 B2 | 8/2010 | Ha et al. | |
| 7,785,396 B2 | 8/2010 | Hwang et al. | |
| 7,823,249 B2 | 11/2010 | Zahuranec et al. | |
| D635,728 S | 4/2011 | Fjellman | |
| 7,958,598 B2 | 6/2011 | Yun et al. | |
| 7,998,234 B2 | 8/2011 | Hwang et al. | |
| 8,012,250 B2 | 9/2011 | Hwang et al. | |
| 8,021,452 B2 | 9/2011 | Hwang et al. | |
| 8,043,397 B2 | 10/2011 | Hwang et al. | |
| 8,043,410 B2 | 10/2011 | Hwang et al. | |
| 8,060,979 B2 | 11/2011 | Hwang et al. | |
| 8,092,562 B2 | 1/2012 | Sauer et al. | |
| 8,099,825 B2 | 1/2012 | Zahuranec et al. | |
| 8,157,881 B1 * | 4/2012 | Anoszko | B01D 46/0005 55/497 |
| 8,240,001 B2 | 8/2012 | Hwang et al. | |
| D668,824 S | 10/2012 | Miers | |
| 8,286,299 B2 | 10/2012 | Williams et al. | |
| 8,302,250 B2 | 11/2012 | Dyson et al. | |
| 8,312,593 B2 | 11/2012 | Hwang et al. | |
| 8,404,034 B2 | 3/2013 | Hwang et al. | |
| 8,424,154 B2 * | 4/2013 | Beskow | A47L 9/20 15/352 |
| D682,694 S | 5/2013 | van den Hoonaard | |
| 8,449,639 B2 | 5/2013 | Sauer et al. | |
| 8,460,256 B2 | 6/2013 | Michaels et al. | |
| D687,719 S | 8/2013 | Last | |
| 8,661,610 B2 | 3/2014 | Lui et al. | |
| D703,890 S | 4/2014 | Shin et al. | |
| 8,689,398 B2 | 4/2014 | Chung et al. | |
| D704,058 S | 5/2014 | Last | |
| D704,556 S | 5/2014 | van den Hoonaard | |
| 8,726,457 B2 | 5/2014 | Liu et al. | |
| 8,726,459 B2 | 5/2014 | Yun et al. | |
| 8,794,488 B2 | 8/2014 | van der Molen | |
| 8,806,705 B2 | 8/2014 | Minor et al. | |
| 8,893,912 B2 | 11/2014 | Van Der Molen et al. | |
| 8,916,002 B1 | 12/2014 | Landolt | |
| 8,939,302 B2 | 1/2015 | Last et al. | |
| 8,950,939 B2 | 2/2015 | Last et al. | |
| 9,015,897 B2 | 4/2015 | Jonsson et al. | |
| D731,136 S | 6/2015 | Yun et al. | |
| D731,720 S | 6/2015 | Gidwell et al. | |
| D731,724 S | 6/2015 | Cheon et al. | |
| 9,113,764 B2 | 8/2015 | Theising | |
| D738,584 S | 9/2015 | Niedzwecki | |
| 9,138,113 B2 | 9/2015 | Nesom et al. | |
| 9,145,237 B2 | 9/2015 | Van Der Molen | |
| D742,083 S | 10/2015 | Gidwell et al. | |
| 9,232,879 B2 | 1/2016 | Schultink et al. | |
| D770,111 S | 10/2016 | Lee et al. | |
| D771,890 S | 11/2016 | Kim | |
| D772,512 S | 11/2016 | Yoon et al. | |
| D774,260 S | 12/2016 | Manning | |
| D775,772 S | 1/2017 | Lee et al. | |
| D792,665 S | 7/2017 | Salagnac | |
| D798,009 S | 9/2017 | Salagnac | |
| D799,767 S | 10/2017 | Palladino et al. | |
| D800,977 S | 10/2017 | Dammkoehler et al. | |
| D800,978 S | 10/2017 | Dammkoehler et al. | |
| D800,980 S | 10/2017 | Carter et al. | |
| D804,114 S | 11/2017 | Kim et al. | |
| 2005/0091784 A1 | 5/2005 | Bone | |
| 2005/0183230 A1 | 8/2005 | Uehigashi | |
| 2005/0273968 A1 | 12/2005 | Seith | |
| 2006/0242787 A1 | 11/2006 | Bosses | |
| 2007/0214597 A1 | 9/2007 | Suzuki | |
| 2008/0134461 A1 | 6/2008 | Hedelund Nielsen | |
| 2009/0139048 A1 | 6/2009 | Williams | |
| 2009/0241285 A1 | 10/2009 | Hinklin et al. | |
| 2010/0230410 A1 | 9/2010 | Last et al. | |

(56) References Cited

U.S. PATENT DOCUMENTS

| | | | |
|---|---|---|---|
| 2010/0293742 A1 | 11/2010 | Chung et al. | |
| 2011/0232687 A1 | 9/2011 | Stein | |
| 2012/0152280 A1 | 6/2012 | Bosses et al. | |
| 2012/0261441 A1 | 10/2012 | van den Hoonaard | |
| 2012/0267891 A1 | 10/2012 | Walz et al. | |
| 2013/0185892 A1 | 7/2013 | Walker | |
| 2013/0199662 A1 | 8/2013 | Gebbink et al. | |
| 2014/0144865 A1 | 5/2014 | Last | |
| 2016/0051109 A1 | 2/2016 | Hwang et al. | |
| 2016/0214046 A1* | 7/2016 | Jursich | B01D 46/0005 |
| 2017/0000305 A1 | 1/2017 | Gordon et al. | |
| 2017/0136483 A1* | 5/2017 | Slama | B01D 46/0001 |
| 2017/0182445 A1* | 6/2017 | Zhang | B01D 46/0016 |
| 2017/0258282 A1 | 9/2017 | Shinagawa | |
| 2018/0193783 A1* | 7/2018 | Baldinger | B01D 46/0005 |
| 2018/0304187 A1* | 10/2018 | Schuld | B01D 46/4227 |

FOREIGN PATENT DOCUMENTS

| | | |
|---|---|---|
| CN | 1090469 | 9/2002 |
| CN | 2527215 | 12/2002 |
| CN | 2528381 | 1/2003 |
| CN | 1463669 | 12/2003 |
| CN | 100382739 | 3/2005 |
| CN | 1765306 | 5/2006 |
| CN | 1951295 | 4/2007 |
| CN | 1954754 | 5/2007 |
| CN | 1954766 | 5/2007 |
| CN | 1973749 | 6/2007 |
| CN | 201015573 | 2/2008 |
| CN | 100374062 | 3/2008 |
| CN | 101229029 | 7/2008 |
| CN | 201153911 | 11/2008 |
| CN | 101313832 | 12/2008 |
| CN | 201167925 | 12/2008 |
| CN | 100450412 | 1/2009 |
| CN | 101387876 | 3/2009 |
| CN | 101558970 | 10/2009 |
| CN | 101558976 | 10/2009 |
| CN | 100571593 | 12/2009 |
| CN | 101596086 | 12/2009 |
| CN | 101612016 | 12/2009 |
| CN | 101756674 | 6/2010 |
| CN | 101822508 | 9/2010 |
| CN | 101945607 | 1/2011 |
| CN | 101953666 | 1/2011 |
| CN | 201734660 | 2/2011 |
| CN | 102068220 | 5/2011 |
| CN | 102256524 | 11/2011 |
| CN | 102599857 | 7/2012 |
| CN | 202288130 | 7/2012 |
| CN | 202526083 | 11/2012 |
| CN | 103037746 | 4/2013 |
| CN | 202932857 | 5/2013 |
| CN | 203138359 | 8/2013 |
| CN | 203302992 | 11/2013 |
| CN | 203314892 | 12/2013 |
| CN | 103874446 | 6/2014 |
| CN | 203861136 | 10/2014 |
| CN | 203861137 | 10/2014 |
| CN | 203885442 | 10/2014 |
| CN | 203914785 | 11/2014 |
| CN | 104224049 | 12/2014 |
| CN | 204192519 | 3/2015 |
| CN | 204274321 | 4/2015 |
| CN | 205092625 | 3/2016 |
| CN | 105496311 | 4/2016 |
| CN | 105496312 | 4/2016 |
| CN | 205162973 | 4/2016 |
| CN | 205162975 | 4/2016 |
| CN | 105534412 | 5/2016 |
| CN | 105581731 | 5/2016 |
| CN | 105595920 | 5/2016 |
| CN | 105640438 | 6/2016 |
| CN | 205458450 | 8/2016 |
| CN | 205514398 | 8/2016 |
| CN | 205514399 | 8/2016 |
| CN | 205514400 | 8/2016 |
| CN | 205514401 | 8/2016 |
| CN | 205649469 | 10/2016 |
| CN | 106175594 | 12/2016 |
| DE | 10055926 | 5/2002 |
| DE | 102007036157 | 2/2009 |
| DE | 202008002310 | 6/2009 |
| DE | 102008010068 | 8/2009 |
| DE | 102008038893 | 2/2010 |
| DE | 102009035717 | 2/2011 |
| DE | 102011006542 | 10/2012 |
| DE | 102011052023 | 1/2013 |
| DE | 202011052208 | 3/2013 |
| DE | 202013100862 | 3/2013 |
| DE | 202013103508 | 8/2013 |
| DE | 102014002743 | 9/2014 |
| DE | 102014109596 | 2/2015 |
| DE | 202015101218 | 4/2015 |
| DE | 202014100563 | 5/2015 |
| DE | 102014209925 | 11/2015 |
| DE | 102015108462 | 12/2016 |
| EP | 18369412 | 9/2007 |
| EP | 1894507 | 3/2008 |
| EP | 1480545 | 4/2008 |
| EP | 1318746 | 9/2009 |
| EP | 2380477 | 10/2011 |
| EP | 2249688 | 5/2013 |
| EP | 2378940 | 5/2013 |
| EP | 1933685 | 3/2014 |
| EP | 2732747 | 5/2014 |
| EP | 2772173 | 9/2014 |
| EP | 2820991 | 1/2015 |
| GB | 879781 | 10/1961 |
| GB | 2407257 | 4/2005 |
| GB | 2441962 | 3/2008 |
| WO | 2007033977 | 3/2007 |
| WO | 2009011482 | 1/2009 |
| WO | 2016096045 | 1/2016 |
| WO | 2016206732 | 12/2016 |

OTHER PUBLICATIONS

Dirt Devil Hand Vac Owner's Manual for Model No. 1-500181-001, 1995, (8 pages).

International Invitation to Pay Additional Fees and Partial International Search for Application No. PCT/US2017/027671 dated Oct. 2, 2017 (15 pages).

International Search Report and Written Opinion for Application No. PCT/US2014/027671 dated Nov. 30, 2017. 22 pages.

European Patent Office Examination Report for Application No. 17721234.7 dated Sep. 19, 2019 (7 pages).

* cited by examiner

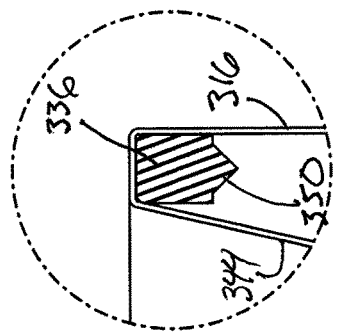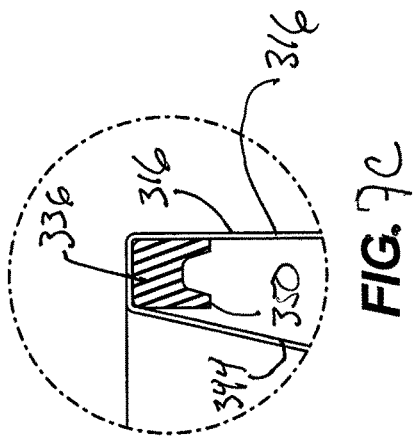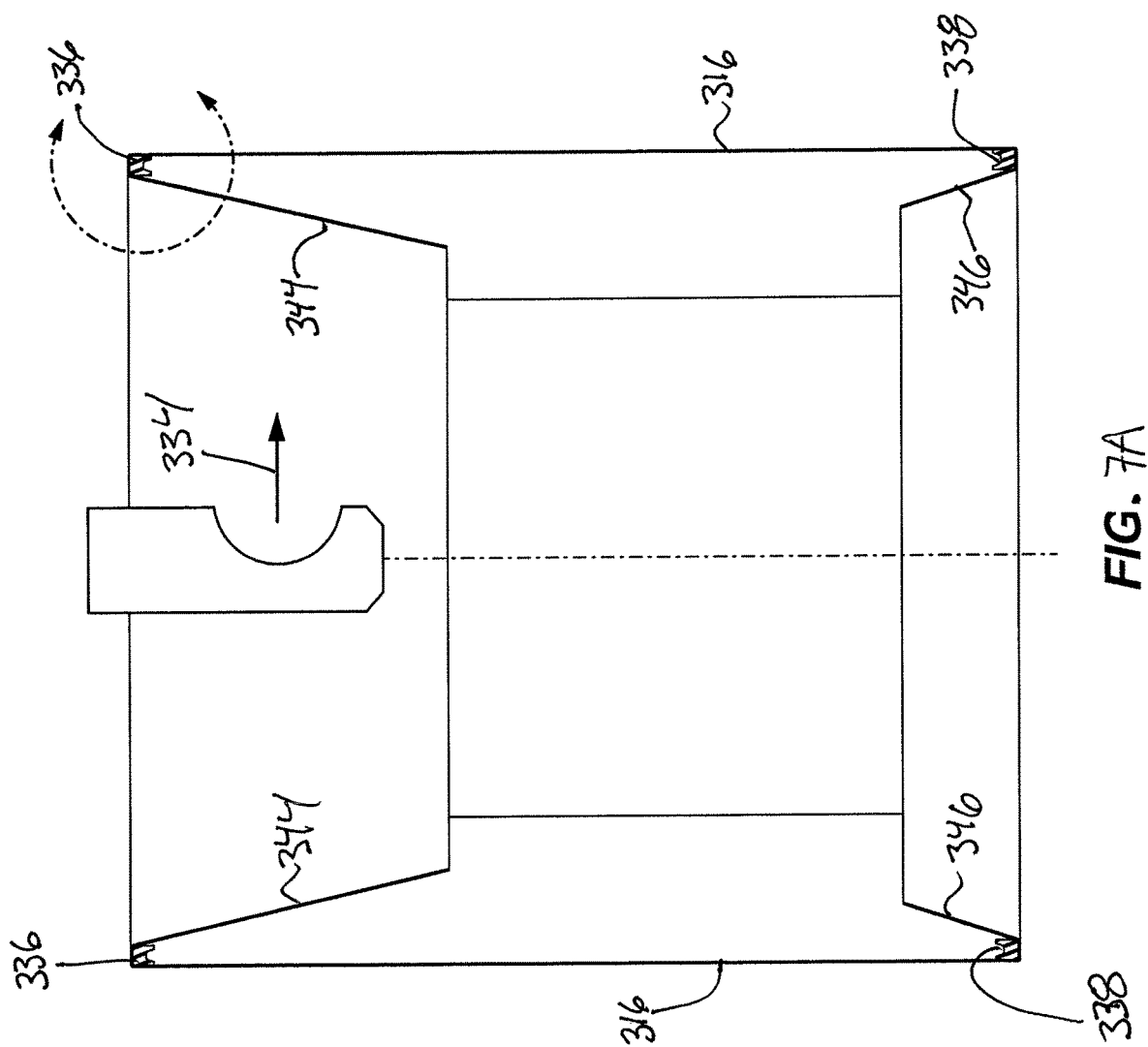

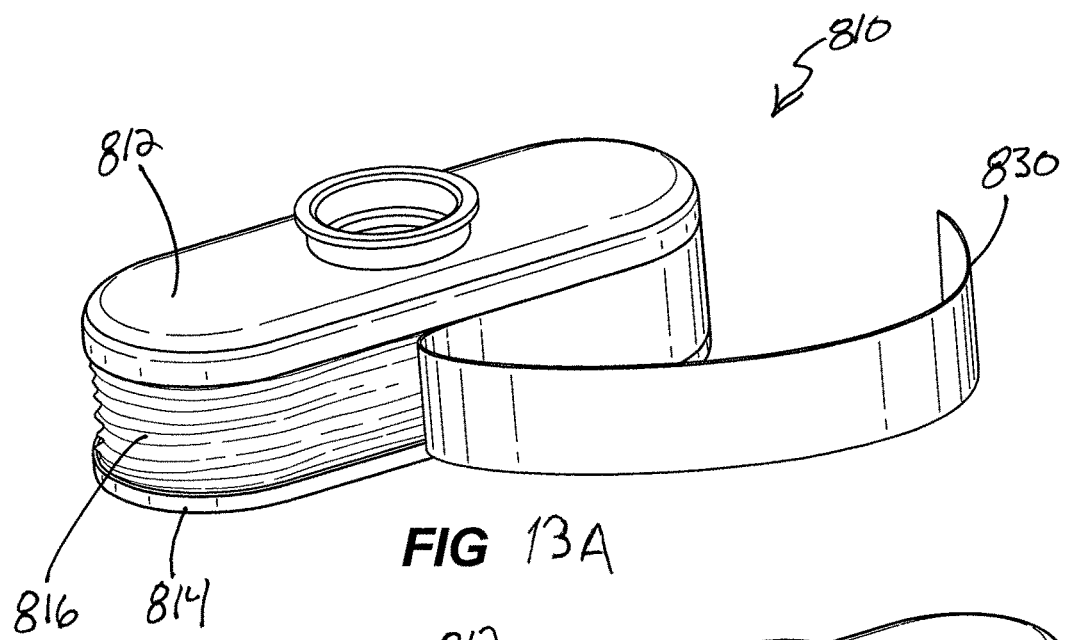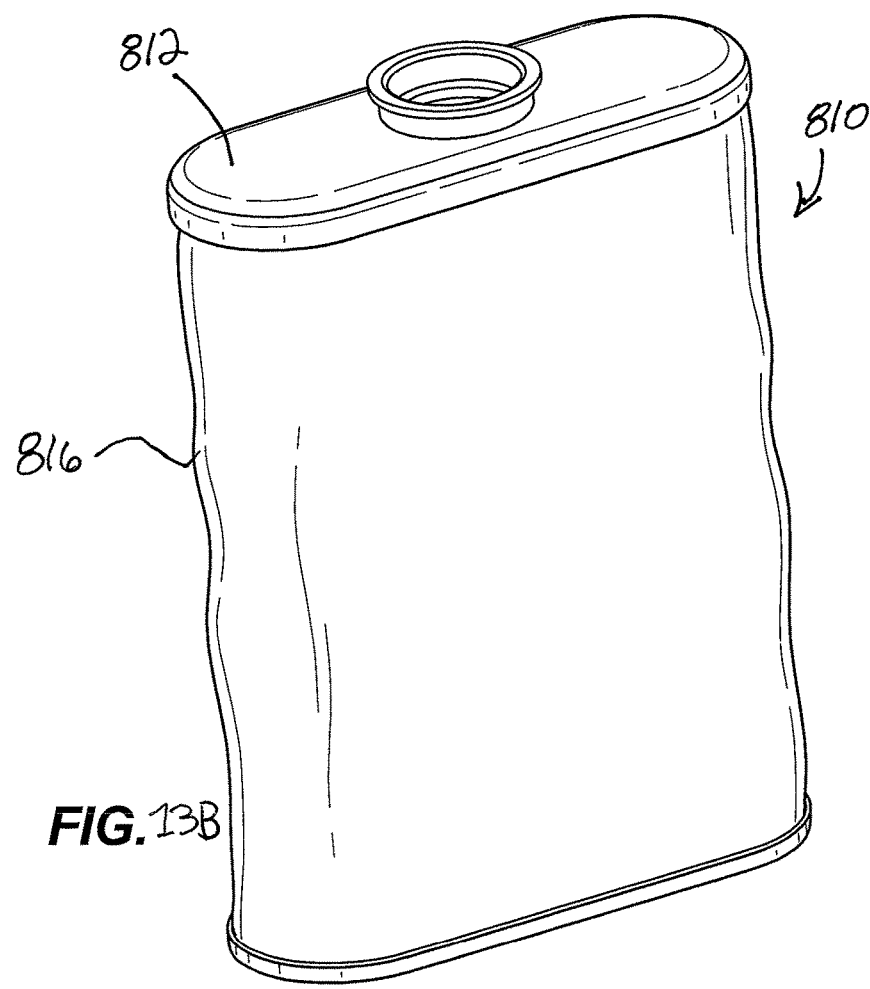

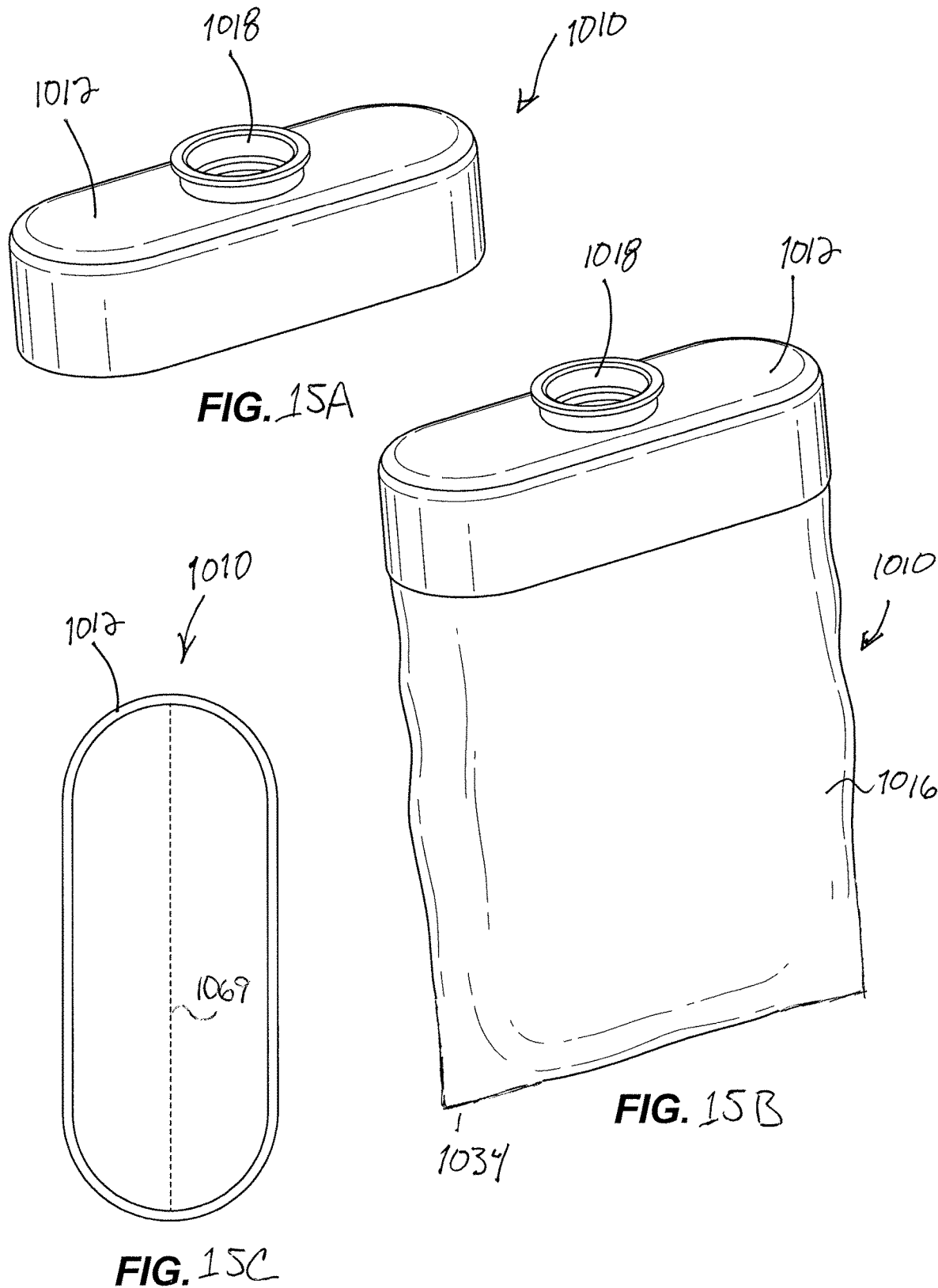

VACUUM FILTER

CROSS-REFERENCE TO RELATED APPLICATIONS

This application claims priority to the following: U.S. Provisional Patent Application No. 62/323,384, filed Apr. 15, 2016, U.S. Provisional Patent Application No. 62/361,718, filed Jul. 13, 2016, U.S. Provisional Patent Application No. 62/457,329, filed Feb. 10, 2017, U.S. Provisional Patent Application No. 62/457,543, filed Feb. 10, 2017, the entire contents all of which are hereby incorporated by reference herein.

FIELD OF THE INVENTION

The present invention relates to filters for vacuums.

BACKGROUND

Conventional vacuum cleaners collect debris using either a dust bag or a dust bin connected to a cyclone. For vacuums utilizing a cyclone and dust bin to collect debris, the debris is disposed of and the cyclone and dust bin is reused. For vacuums utilizing a dust bag to collect and store debris, the bag is discarded and replaced with a new bag once the dust bag is full.

SUMMARY

In one embodiment, disclosed is a filter configured to separate debris from a flow of fluid. The filter includes a housing and a filter media coupled to the housing to form a collection container. The collection container is configured to store debris separated by the filter media from a flow of fluid. The filter further includes an inlet opening that extends through the housing to provide fluid communication into the collection container such that the flow of fluid with the debris can flow into the collection container and a relatively clean flow of fluid exits through the filter media. The filter further includes an attachment member that couples the filter media to the housing.

In another embodiment, disclosed is a filter is configured to separate debris from a flow of fluid. The filter includes a housing having a first inner volume and a filter media having a first end and a second end. The filter further includes an attachment member that couples the filter media to the housing at least partially forming a collection container configured to store the debris separated by the filter media. The first end of the filter media is folded such that at least a portion of the first end extends away from the housing forming an overlapping filter media section.

In another embodiment, disclosed is a filter configured to separate debris from a flow of fluid. The filter comprises a housing having a first inner volume, a filter media having a first end, a second end, and a second inner volume between the first and second ends. The filter media is coupled to the housing at the first end of the filter media such that the first and second inner volumes together at least partially define a collection container configured to store the debris separated by the filter media from the flow of fluid. The filter further includes an inlet opening that extends through the housing to provide fluid communication into the collection container such that the flow of fluid with debris can flow into the collection container and a relatively clean flow of fluid exits through the filter media between the first and second ends of the filter media. The filter media is collapsible into the first inner volume of the housing.

In another embodiment, disclosed is a filter configured to separate debris from a flow of fluid. The filter includes a first housing, a second housing having a first inner volume, and a filter media having a first end, a second end, and a second inner volume between the first and second ends. The filter media is coupled to the first housing at the first end of the filter media and the filter media is coupled to the second housing at the second end of the filter media such that the first and second inner volumes together at least partially define a collection container configured to store the debris separated by the filter media. The filter further includes an inlet opening that extends through the first housing to provide fluid communication into the collection container such that the flow of fluid with debris can flow into the collection container and a relatively clean flow of fluid exits through the filter media between the first and second ends of the filter media. The filter media is collapsible into the first inner volume of the second housing.

In another embodiment, disclosed is a filter configured to separate debris from a flow of fluid. The filter includes a first housing, a second housing, and a filter media having a first end, a second end, and an inner volume between the first and second ends. The filter media is coupled to the first housing at the first end of the filter media and the filter media is coupled to the second housing at the second end of the filter media such that the first and second housings and the inner volume of the filter media together at least partially define a collection container configured to store the debris separated by the filter media. The filter further includes an inlet opening that extends through the first housing to provide fluid communication into the collection container such that the flow of fluid with debris can flow into the collection container and a relatively clean flow of fluid exits through the filter media between the first and second ends of the filter media. The filter media is collapsible between the first and second housing in a collapsed position and the filter media is movable to an expanded position.

In another embodiment, disclosed is a method of manufacturing a filter. The method includes providing a housing having an inlet aperture, rolling a filter media into a cylindrical shape with a first end and a second end, after rolling the filter media, attaching the first end of the filter media to the housing to close the first end of the filter media, after rolling the filter media, closing the second end of the filter media. The method further includes collapsing the filter media within in an inner volume of the housing.

Other aspects of the invention will become apparent by consideration of the detailed description and accompanying drawings.

BRIEF DESCRIPTION OF THE DRAWINGS

FIG. 7A is a cross-sectional view of the filter, illustrating the filter media of the filter without the upper and lower housing.

FIG. 7B is an enlarged view of the filter of FIG. 7A, illustrating an embodiment of an attachment member.

FIG. 7C is an enlarged view of the filter of FIG. 7A, illustrating another embodiment of an attachment member.

FIG. 13A is a perspective view of a filter in a collapsed position according to an embodiment of the invention.

FIG. 13B is a perspective view of the filter of FIG. 13A in an expanded position.

FIG. 15A is a perspective view of a filter in a collapsed position according to an embodiment of the invention.

FIG. 15B is a perspective view of the filter of FIG. 15A in an expanded position.

FIG. 15C is a bottom side view of the filter of FIG. 15A in the collapsed position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
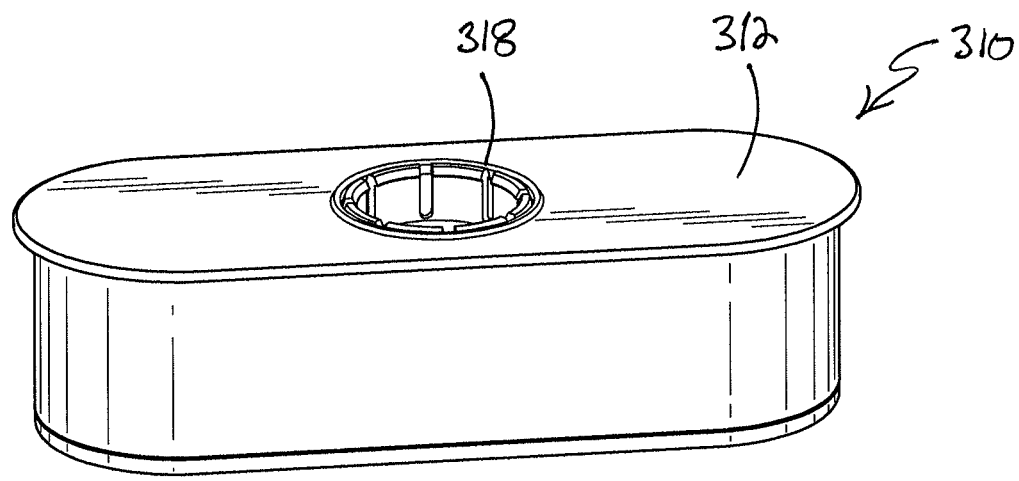
FIG. 1 is a perspective view of a filter in a collapsed position according to an embodiment of the invention.
Figure 2:
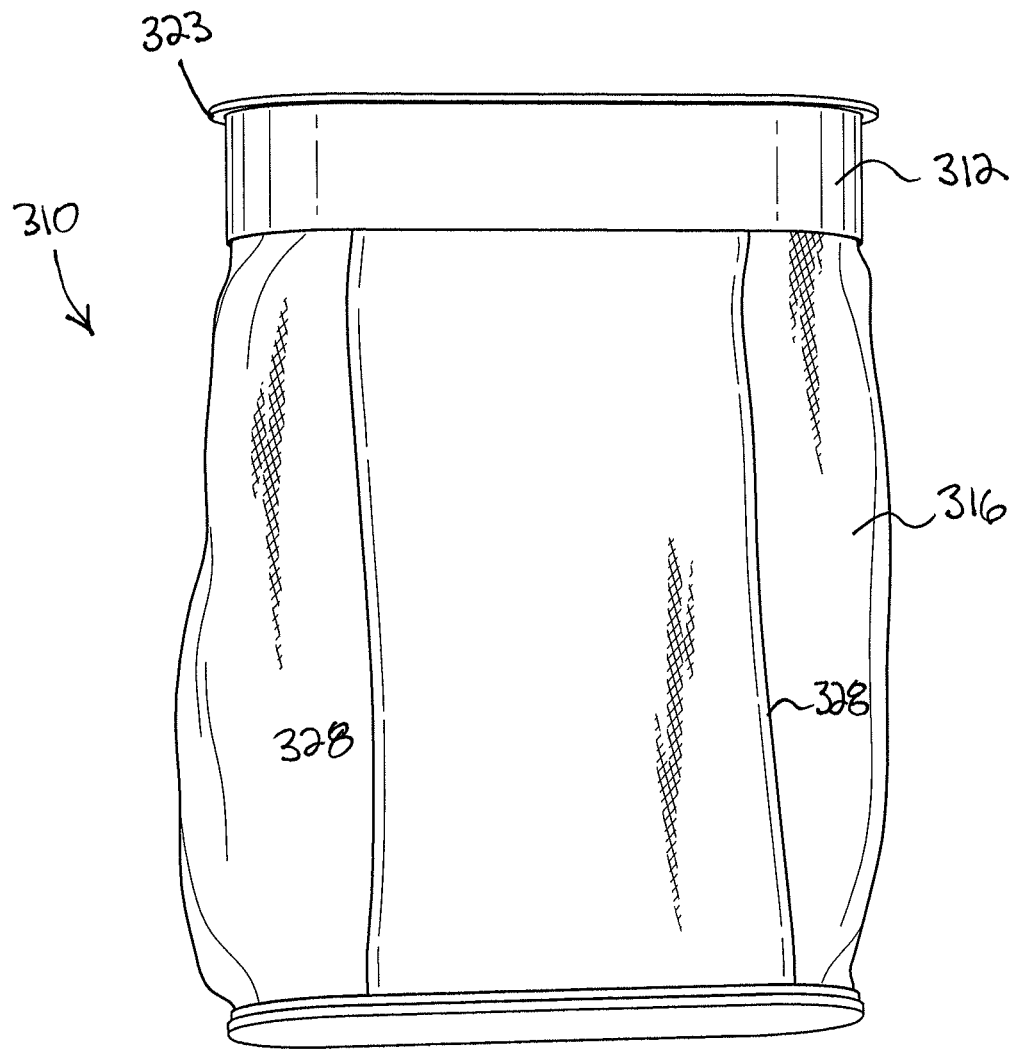
FIG. 2 is a perspective view of the filter of FIG. 1 in an expanded position.

FIGS. 1 and 2 illustrate a filter 310. The filter 310 can move between a collapsed position (FIG. 1) and an expanded position (FIG. 2). The filter 310 may be supplied to the consumer in the collapsed position. Then, in one embodiment, the filter 310 is installed in a device in the collapsed position and then automatically moves to the expanded position. The filter 310 can automatically move to the expanded position by air pressure, gravity, mechanical push or pull, etc. In an alternative embodiment, the consumer moves the filter to the expanded position prior to installing the filter into a device. The filter 310 can be used to filter any suitable fluid in several applications. For example, the filter 310 can be used in vacuum cleaners, air purifiers, HVAC systems, automotive applications, etc.

With reference to FIGS. 1 and 2, the filter 310 includes a first or upper housing 312, a second or lower housing 314, and filter media 316. The upper housing 312 includes an inlet opening 318 that provides fluid communication into the filter 310. In some embodiments, a valve 319 is located within the inlet opening 318 to open and close the inlet opening 318. For example, when the filter 310 is ready to be removed from the device (e.g., vacuum), the valve 319 is closed so that debris within the filter 310 does not escape through the inlet opening 318. The upper housing 312 has an inner volume 320 (see FIG. 5A) within the housing 312. Likewise, the lower housing 314 includes an inner volume 321. The inner volumes 320, 321 of the upper housing 312 and the lower housing 314 can be equal or one of the volumes can be greater than the other. In various alternatives, the inner volumes of one or both of the upper housing and the lower housing are small or inappreciable due to the shape of the housing. The upper housing 312 and the lower housing 314 can be formed from any suitable material, such as thermoplastic material, thermoset material, molded paper pulp, formed or molded filter media, or any other suitable material. Alternatively or additionally, the upper housing 312 forms a support collar 323 for installing the filter 310 in a vacuum cleaner.

Figure 3:
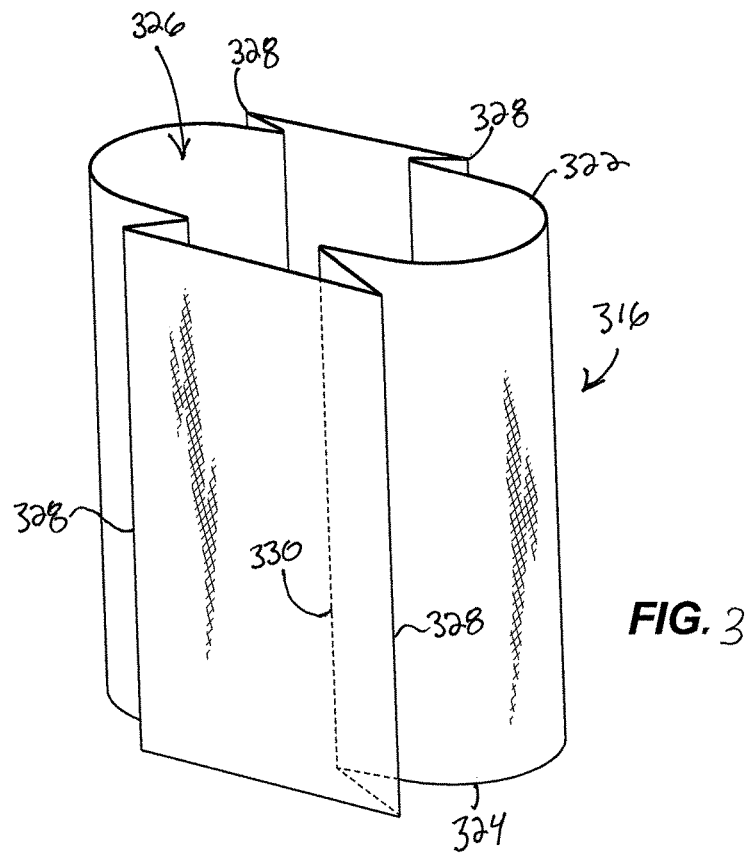
FIG. 3 is a perspective view of the filter of FIG. 2, illustrating filter media of the filter without an upper and lower housing.
Figure 4:
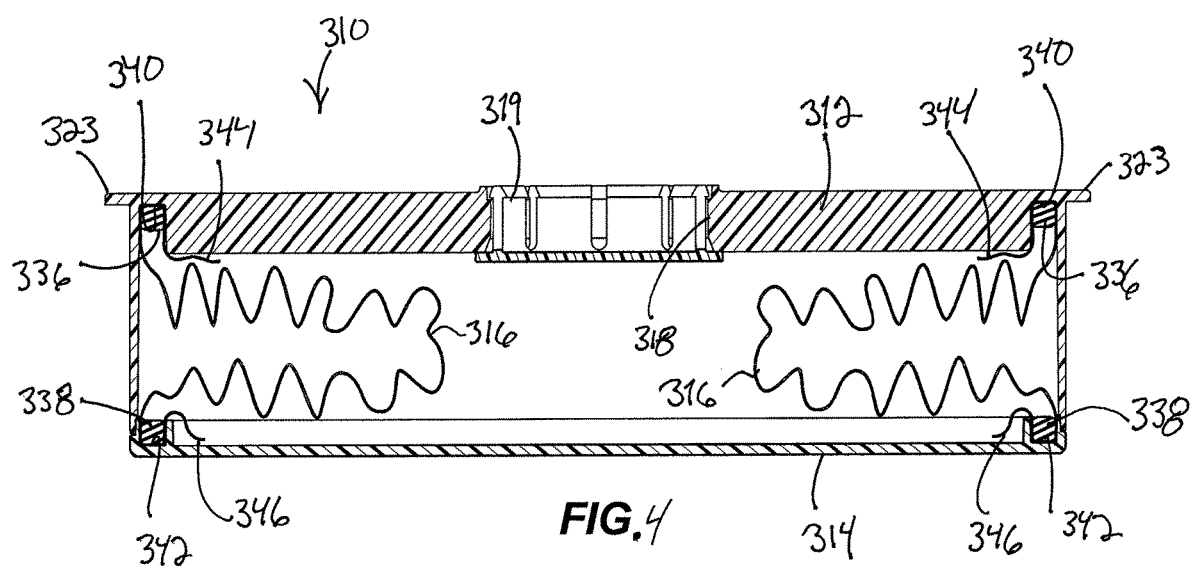
FIG. 4 is a cross-sectional view of the filter in the collapsed position.

With reference to FIG. 3, the filter media 316 includes a first end 322 and a second end 324. The filter media 316 is coupled to the upper housing 312 proximate the first end 322 while, the filter media 316 is coupled to the lower housing 314 proximate the second end 324. An inner volume 326 of the filter media 316 is defined between the first end 322 and the second end 324 of the filter media 316. Optionally, the filter media 316 includes one or more pleats 328 extending between the first end 322 and the second end 324. The pleats 328 enable the filter 310 to enlarge beyond the expanded position in a direction transverse to the direction traveled between the collapsed and expanded positions. In other words, the pleats 328 allow the filter 310 to billow outward in order to collect and store additional debris as the filter 310 fills. The illustrated filter media 316 typically includes a seam 330. Generally, the filter media 316 is a flat piece that is made tubular by joining two ends together, thereby creating the seam 330. As shown, the seam 330 is located within one of the pleats 328 to substantially hide the seam 330. The seam 330 can be formed by sewing, heat welding, crimping, or other suitable means of coupling the two ends together.

With reference to FIGS. 1 and 2, the filter 310 can move between a collapsed position (FIG. 1) and an expanded position (FIG. 2). In the collapsed position, the filter media 316 is located within the inner volume 320 of the upper housing 312 and/or in the inner volume of the lower housing 314. Also, the upper housing 312 and the lower housing 314 enclose the filter media 316 in the collapsed position. In some embodiments, the upper housing 312 and/or lower housing 314 can snap or otherwise connect together to retain the filter 310 in the collapsed position by interlocking features provided in the upper and lower housings. Alternatively, the filter 310 may be held in the collapsed position by tape, film, bag, or other attachments. Typically, the filter 310 would be supplied to the user in the collapsed position. In the expanded position, the filter media 316 generally expands out to an operative length and is ready for use as a filter. In some applications, the filter 310 automatically moves from the collapsed position to the expanded position. For example, when a flow of dirty fluid enters the filter 310 through the inlet opening 318, the pressure of the fluid automatically expands the filter 310. In other applications, gravity may automatically expand the filter 310, or a mechanism may be used to push or pull one or both housings away from the other.

The inner volume 326 of the filter media, along with the inner volume 320 of the upper housing 312, and the inner volume 321 of the lower housing 314 together define a collection container 332 that stores debris separated by the filter media 316. That is, a dirty fluid (e.g., air and dust, dirt, or other particles) travels into the filter 310 through the inlet opening 318. The dirt or dust is separated from the air flow by the filter media 316 and relatively clean air flows out of the filter 310 through the filter media 316 between the housings 312, 314. This airflow is generally represented by the arrows 334.

Figure 5:
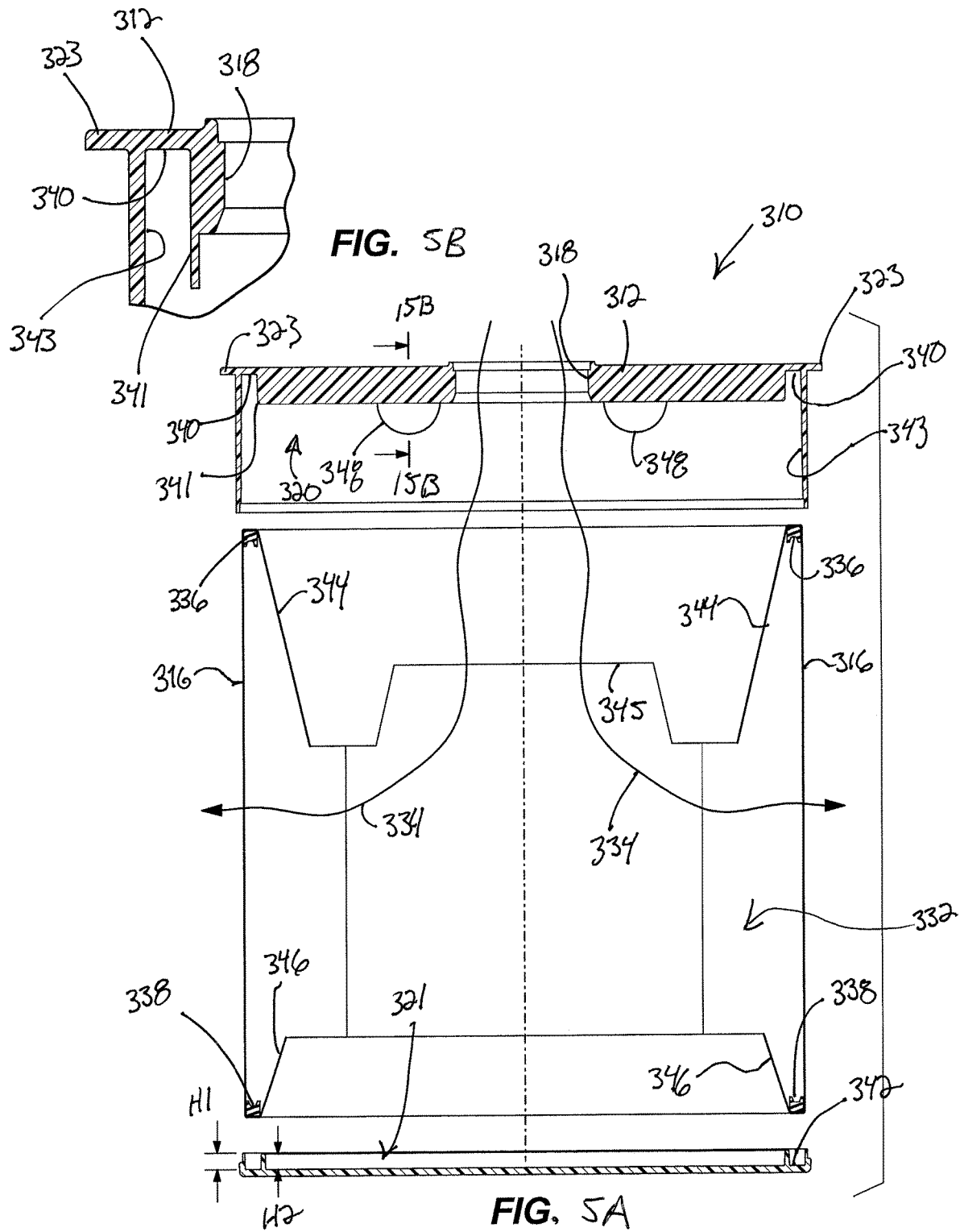
FIG. 5A is an exploded cross-sectional view of the filter in the expanded position.
FIG. 5B is a cross-sectional view of the filter along line 5B-5B of FIG. 5A.

The filter 310 further includes a first attachment member 336 that couples the filter media 316 to the upper housing 312. In the illustrated embodiments, the filter media is folded over the first attachment member 336 between the first end 322 and the second end 324 of the filter media 316, but generally closer to the first end 322, before it is connected to the upper housing 312. Stated another way, all or a portion of the first end 322 of the filter media 316 is folded over before being coupled to the upper housing 312. Similarly, the filter 310 includes a second attachment member 338 that couples the filter media 316 to the lower housing 314 between the first end 322 and the second end 324 of the filter media 316, but closer to the second end 324. The first attachment member 336 is received within a groove 340 of the upper housing 312 holding the filter media in place, whereas the second attachment member 338 is received within a groove 342 of the lower housing 314. The grooves 340, 342 are formed with an inner wall 341 and an outer wall 343. As shown in FIG. 5A, the height H1 of the outer wall 343 is greater than the height H2 of the inner wall 341. In an alternative embodiment, the height H1 of the outer wall 343 is the same as the height H2 of the inner wall 341.

To couple the filter media 316 to the upper housing 312 in the illustrated embodiment, all or a portion of the end of the filter media 316 is folded over the first attachment member 336 and fitted into the groove 340 of the upper housing 312. As such, the filter media 316 is disposed between the groove 340 and the first attachment member 336. The fit between the groove 340 and the attachment member 336 with filter media 316 is a friction or limited clearance fit to wedge the filter media 316 and attachment member 336 into the groove 340 to couple the filter media 316 to the upper housing 312. Alternatively, the attachment member 336 is staked, welded, snap fit, adhered, or otherwise fastened to the upper housing 312 to couple the filter media 316 to the upper housing 312. In one alternative, at least a portion of the edge 322 of the first end 322 of the filter media 316 is retained in the groove 340 by fitting the attachment member 336 into the groove 340. The connection of the filter media 316 to the upper housing 312 is provided around the upper housing 312 inhibiting airflow through the connection.

To couple the filter media 316 to the lower housing 314, the filter media 316 is wrapped around the second attachment member 338 and fitted into the groove 342 of the lower housing 314 in a similar way as described for the filter media 316 coupling to the upper housing 312. As such, the filter media 316 is retained in the groove 342 by fitting the second attachment member 338 into the groove 342. The connection of the filter media 316 to the lower housing 314 is provided around the lower housing 314 inhibiting airflow through the connection. In various alternatives, the connection of the filter media 316 to the lower housing 314 may use a different method than the connection to the upper housing 312. In one alternative, the filter media 316 does not use a lower housing 314, instead closing the second end 324 with a seam or other closure.

The filter 310 may include a first overlapping filter media section 344 and a second overlapping filter media section 346. The first overlapping filter media section 344 is proximate the upper housing 312 and is a result of the first end 322 of the filter media 316 being folded such that at least a portion of the first end 322 extends away from the housing 312 forming the overlapping filter media section 344. In the illustrated embodiment, the first end 322 of the filter media 316 is folded over the attachment member 336 in a manner that the first end 322 extends away from the upper housing 312 a desired length. As such, the filter media 316 overlaps to provide two layers at the first overlapping filter media section 344. The first overlapping filter media section 344 may extend around the perimeter of the filter 310 or may extend along one or more portions of the perimeter of the filter 310. In certain embodiments, all or desired portions of the overlapping filter media 344 may be trimmed, or filter media 316 positioned such that a desired amount of filter media 316 extends beyond the attachment member 336 in predetermined locations. In the embodiment shown in FIG. 15A, the first overlapping filter media section 344 includes a notch 345 in a portion. The notch 345 inhibits parts of a vacuum (e.g., a conduit that extends into the filter) from catching on the filter media when the conduit inserted and removed from the filter. The second overlapping filter media section 46 is proximate the lower housing 314 and is a results of the second attachment member 338 bending the filter media 316 in a manner that the second end 324 extends away from the lower housing 314. As such, the filter media 316 overlaps to provide two layers and forms the second overlapping filter media section 346. The second overlapping filter media section 346 may extend around the perimeter of the filter 310 or may extend along one or more portions of the perimeter of the filter 310. In certain embodiments, all or desired portions of the overlapping filter media 46 may be trimmed, or filter media 316 positioned such that a desired amount of filter media 316 extends beyond the second attachment member 338 in predetermined locations. In the illustrated embodiment, both of the first and second overlapping filter media sections 344, 346 are disposed in the inner volume 326 of the filter media 316. However, for certain embodiments the filter 310 may be constructed with the overlapping filter media portions 344, 346 being positioned to the outside of the filter 310.

Figure 6:
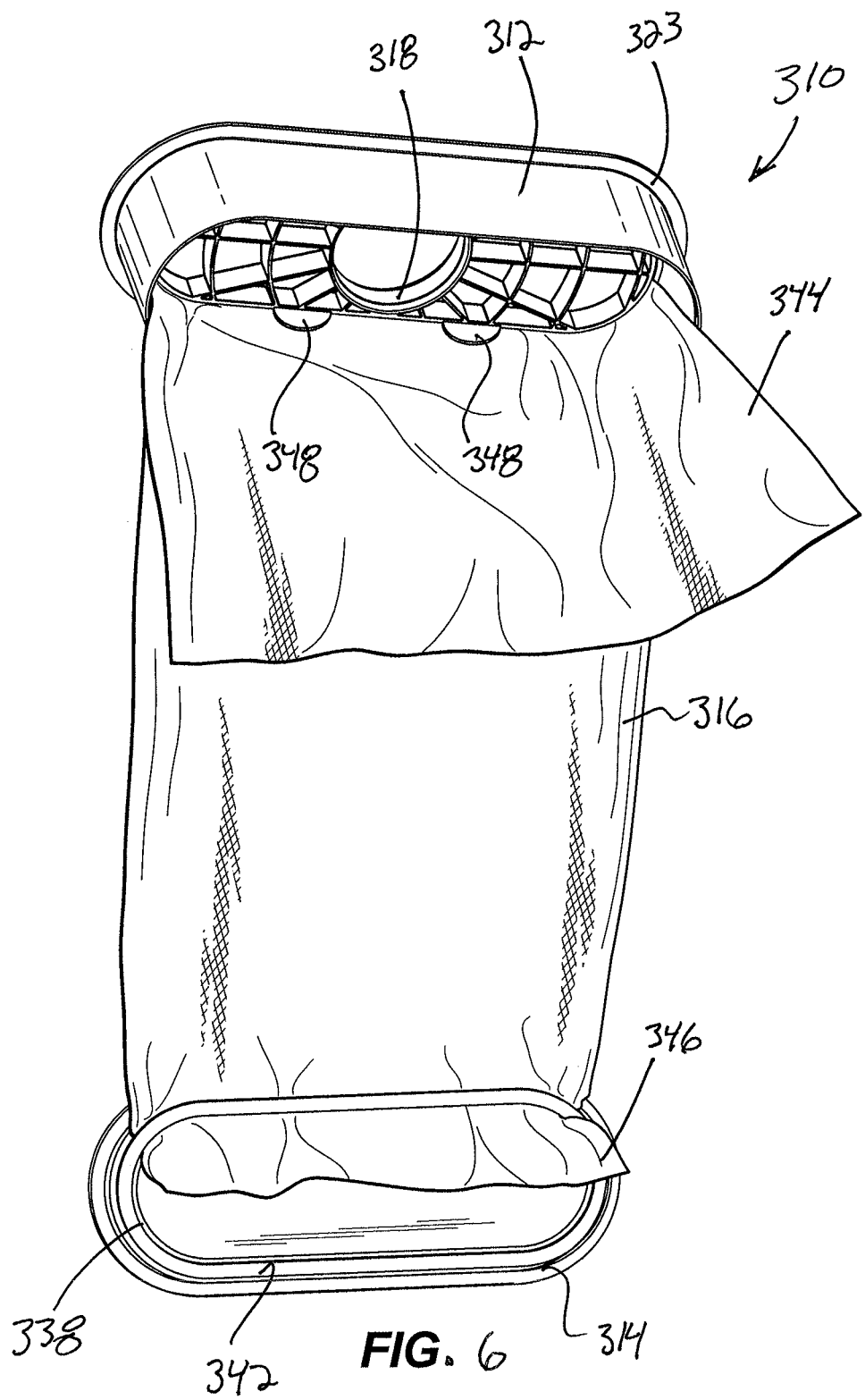
FIG. 6 is a perspective view of an interior of the filter with a portion of the filter media cutaway.

As shown in FIGS. 5A and 6, the upper housing 312 may include one or more extension members 348 adjacent the groove 340. The extensions members 348 are positioned in a location to direct the overlapping filter media section 344 to extend in a direction along the outer wall 343 of the upper housing 312 and filter media 316. The extension members 348 may be integrally formed with the upper housing 312 or may be formed separately and installed in the filter 310.

As previously mentioned, the first overlapping filter media section 344 is proximate the upper housing 314. The length and width and location of the first overlapping filter media section 344 or the second overlapping filter media section 346 may be provided where it is in a direct path of some or all of the airflow (see arrow 334 of FIG. 7A) exiting the device (e.g., a discharge conduit of a vacuum) to receive impact of impinging debris as the debris enters the filter 310.

One or both of the attachment members 336, 338 may include a recess, protrusion, or other shape 350 configured for nesting or attaching to a fixture provided to guide the attachment member 336, 338 into the groove 340, 342. As shown in FIGS. 7B and 7C, the attachment member 336, 338 may include the fixturing recess, protrusion, or other shape 350 on the side facing out of the groove 340, 342.

Figure 8A:
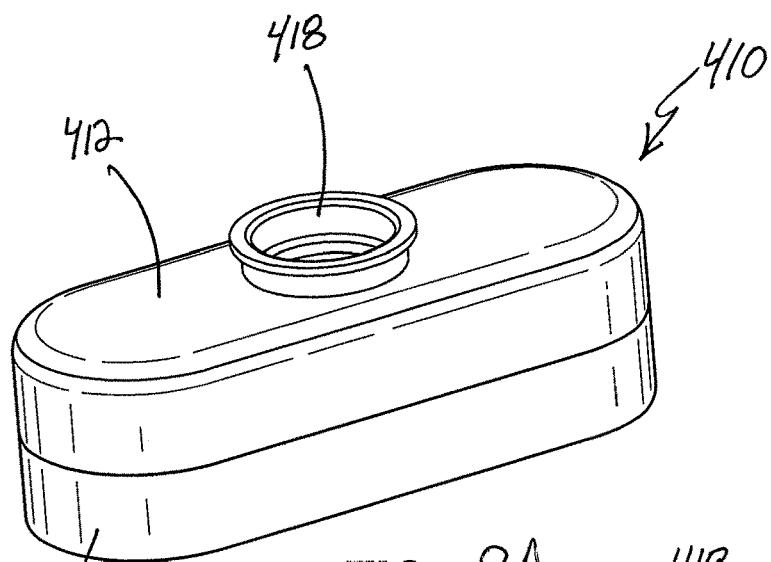
FIG. 8A is a perspective view of a filter in a collapsed position according to an embodiment of the invention.
Figure 8B:
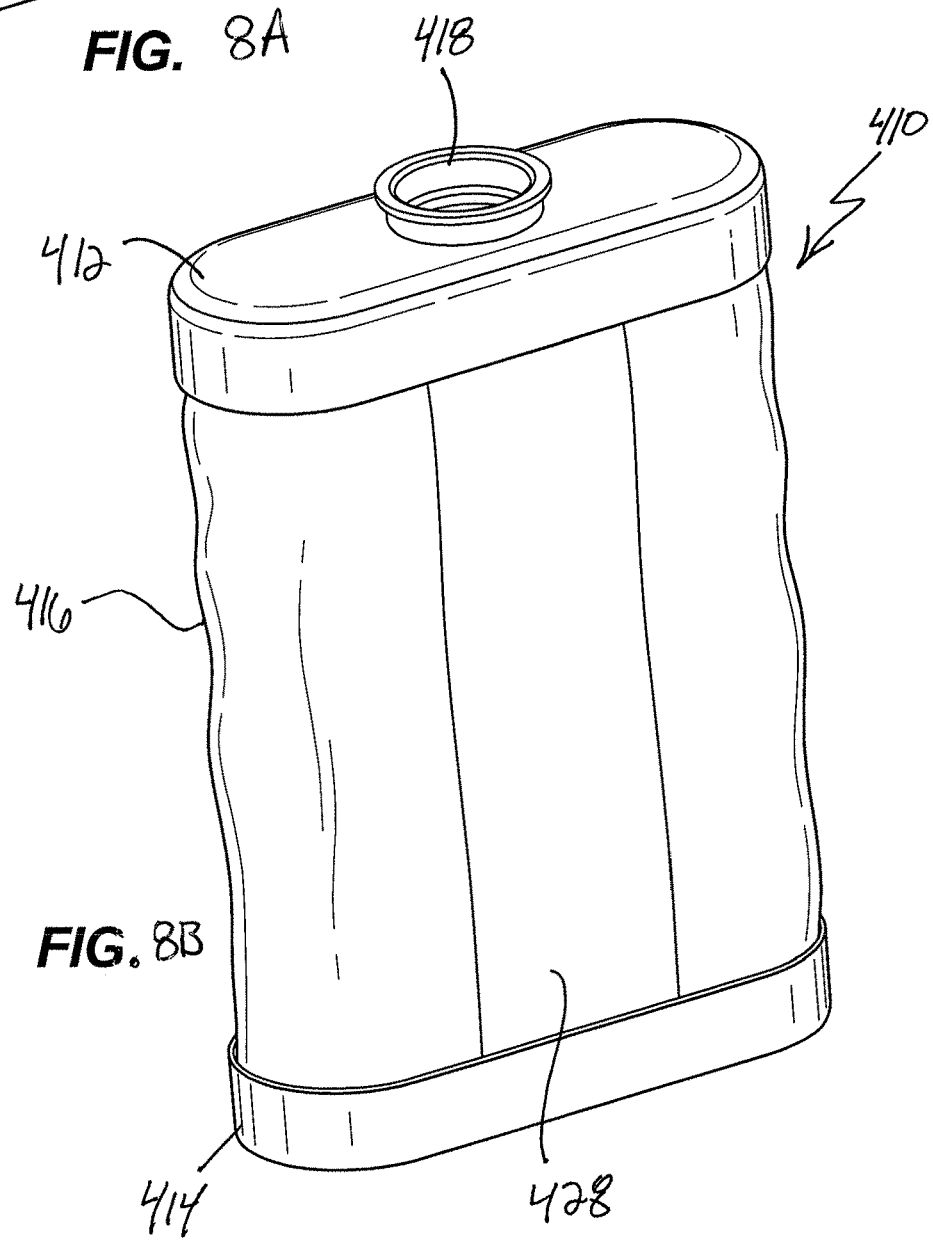
FIG. 8B is a perspective view of the filter of FIG. 8A in an expanded position.

FIGS. 8A and 8B illustrate a filter 410. The filter 410 can move between a collapsed position (FIG. 8A) and an expanded position (FIG. 8B). The filter 410 may be supplied to the consumer in the collapsed position. Then, in one embodiment, the filter 410 is installed in a device in the collapsed position and then automatically moves to the expanded position. The filter 410 can automatically move to the expanded position by air pressure, gravity, mechanical push or pull, etc. In an alternative embodiment, the consumer moves the filter to the expanded position prior to installing the filter into a device. The filter 410 can be used to filter any suitable fluid in several applications. For example, the filter 410 can be used in vacuum cleaners, air purifiers, HVAC systems, automotive applications, etc.

Referring to FIGS. 8A and 8B, the filter 410 includes a first or upper housing 412, a second or lower housing 414, and filter media 416. The upper housing 412 includes an inlet opening 418 that provides fluid communication into the filter 410. In some embodiments, a valve is located within the inlet opening 418 to open and close the inlet opening 418. For example, when the filter 410 is ready to be removed from the device (e.g., vacuum), the valve is closed so that debris within the filter 410 does not escape through the inlet opening 418. The upper housing 412 has an inner volume 420 (see FIG. 16A) within the housing 412. Likewise, the lower housing 414 includes an inner volume. The inner volumes of the upper housing 412 and the lower housing 414 can be equal or one of the volumes can be greater than the other. The upper housing 412 and the lower housing 414 can be formed from any suitable material, such as thermoplastic material, thermoset material, molded paper pulp, formed or molded filter media, or any other suitable material.

Figure 16A:
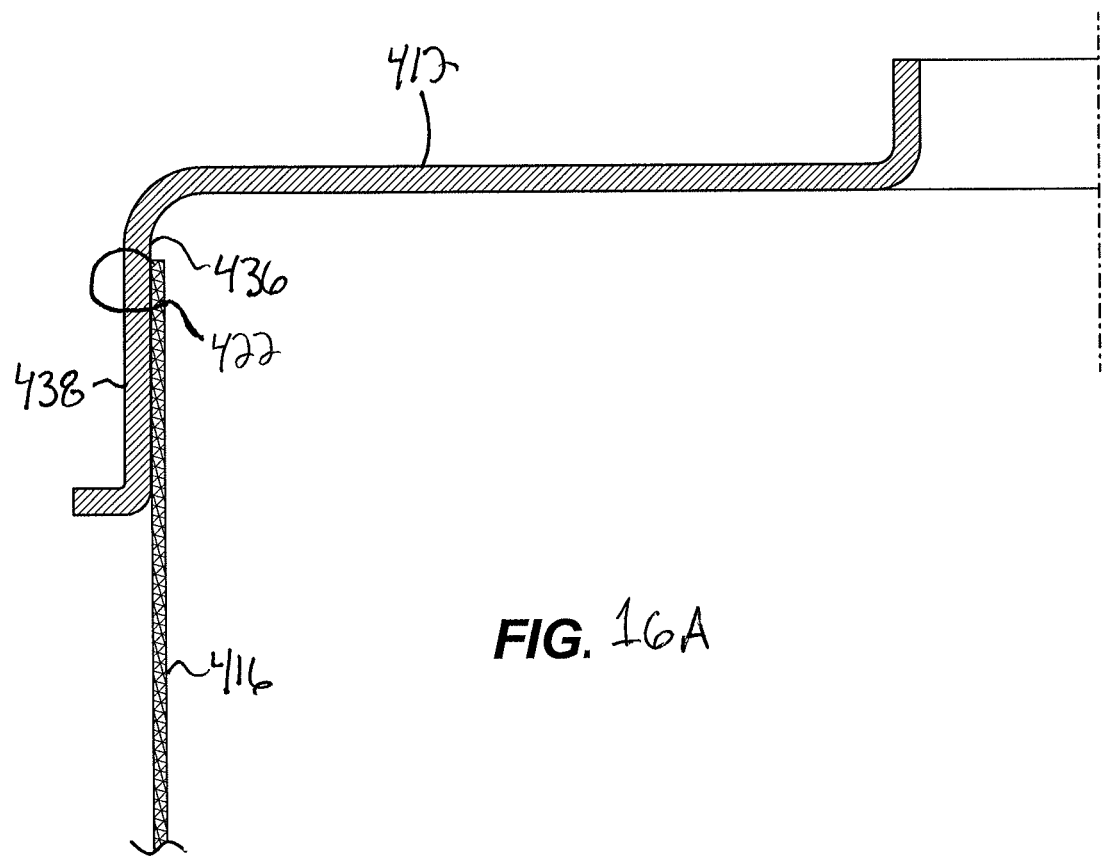
FIG. 16A is a cross-sectional view of a filter according to an embodiment of the invention.

The filter media 416 includes a first end 422 (see FIG. 16A). The filter media 416 is coupled to the upper housing 412 at the first end 422. Likewise, the filter media 416 has a second end and the filter media 416 is coupled to the lower housing 414 at the second end. As will be discussed in more detail below, the first and second ends of the filter media 416 can be attached to the housings 412, 414 using a variety of methods. An inner volume 424 (see FIG. 16A) of the filter media 416 is defined between the first end 422 and the second end (not shown in FIG. 16A) of the filter media 416.

The inner volume 424 of the filter media, along with the inner volume 420 of the upper housing 412, and the inner volume of the lower housing 414 together define a collection container 425 that stores debris separated by the filter media 416. That is, a dirty fluid (e.g., air and dust, dirt, or other particles) travels into the filter 410 through the inlet opening 418. The dirt or dust is separated from the air flow by the filter media 416 and relatively clean air flows out of the filter 410 through the filter media 416 between the housings 412, 414. This airflow is generally represented by the arrows 426 in FIG. 16A.

Referring to FIG. 8B, in one embodiment, a panel 428 is located at a seam of the filter media 416, for example along a vertical seam. In one alternative, the panel 428 is clear to allow a user to see how much debris is in the filter 410 to indicate to the user when the collection container 425 is full. In addition or in other embodiments, the panel 428 can be decorative and/or can include odor absorbing material.

Figure 8C:
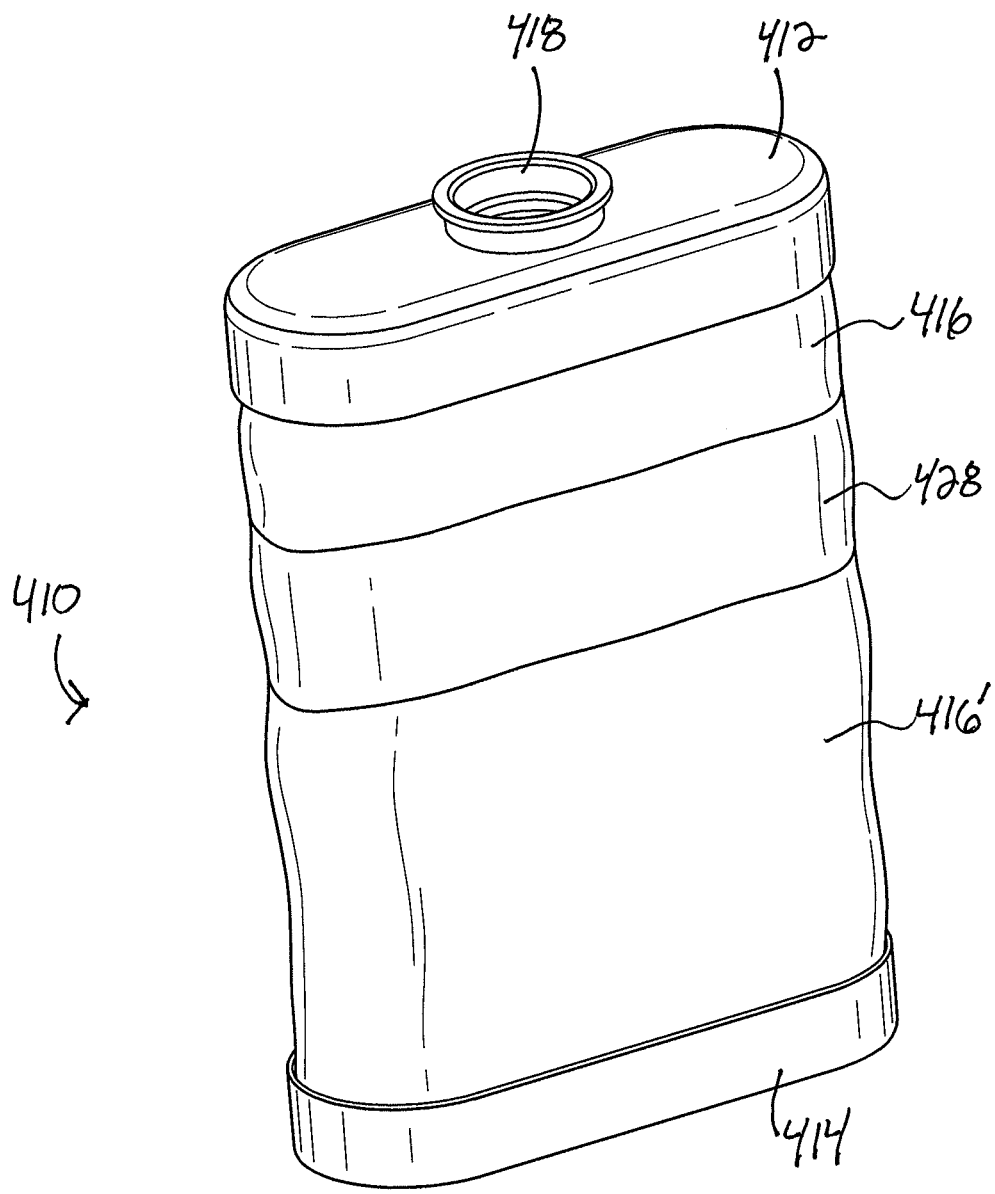
FIG. 8C is a perspective view of an alternative embodiment of the filter of FIG. 8A in an expanded position.

Referring to FIG. 8C, in an alternative embodiment, the filter may be constructed such that the optional panel 428 may be provided along a horizontal seam. In this construction, the filter media 416 is divided into two sections, and the filter media 416 is attached to the housing 412. The second piece of filter media 416' is attached to the filter media 416, optionally with the panel 428 provided along the horizontal seam between the filter media sections 416, 416'.

Referring to FIGS. 8A and 8B, the filter 410 can move between a collapsed position (FIG. 8A) and an expanded position (FIG. 8B). In the collapsed position, the filter media 416 is located within the inner volume 420 (the inner volume being shown in one embodiment in FIG. 16A) of the upper housing 412 and/or in the inner volume of the lower housing 414. Also, the upper housing 412 and the lower housing 414 enclose the filter media 416 in the collapsed position. In some embodiments, the upper housing 412 and/or lower housing 414 can snap or otherwise connect together to retain the filter 410 in the collapsed position by interlocking features provided in the upper and lower housings. Alternatively, the filter 410 may be held in the collapsed position by tape, film, bag, or other attachments. Typically, the filter 410 would be supplied to the user in the collapsed position. In the expanded position, the filter media 416 generally expands out to an operative length and is ready for use as a filter. In some applications, the filter 410 automatically moves from the collapsed position to the expanded position. For example, referring to FIG. 27A, when a flow of dirty fluid (represented by arrows 426) enters the filter 410 through the inlet opening 418, the pressure of the fluid automatically expands the filter 410. In other applications, gravity may automatically expand the filter 410, or a mechanism may be used to push or pull one or both housings away from the other.

Figures 9A, 9B:
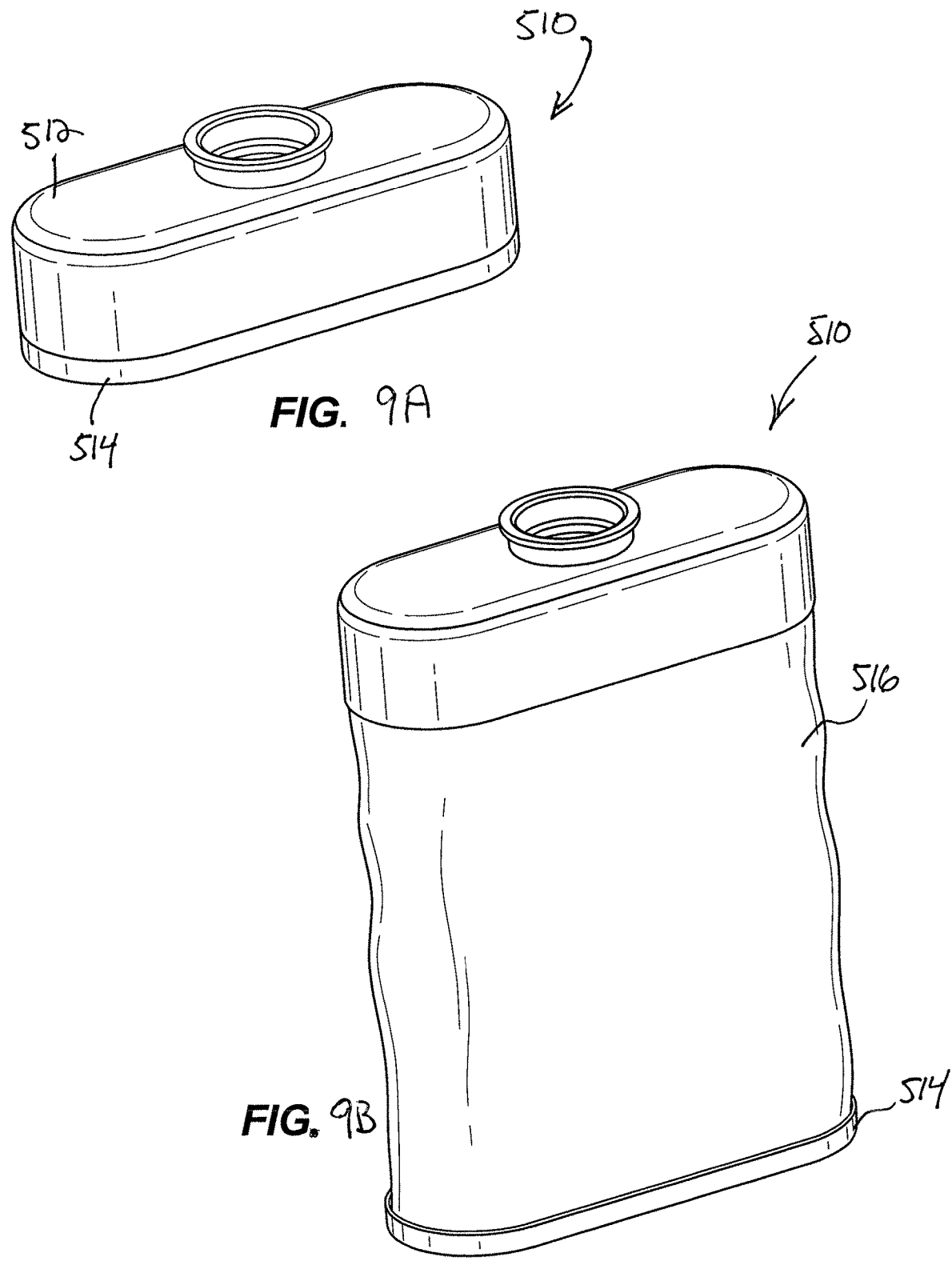
FIG. 9A is a perspective view of a filter in a collapsed position according to an embodiment of the invention.
FIG. 9B is a perspective view of the filter of FIG. 9A in an expanded position.

FIGS. 9A and 9B illustrate a filter 510 according to another embodiment. The filter 510 includes features similar to the filter 410 of FIGS. 8A and 8B and only some differences between the filters 410, 510 will be discussed. The filter 510 includes a lower housing 514 that is generally flat and has very little, if any, inner volume. In the illustrated embodiment, in the collapsed position, the filter media 516 is virtually entirely received in the inner volume of the upper housing 512. In this embodiment, the lower housing 514 functions as a cap to close the upper housing 512 and retain the filter media 516 in the collapsed position. Alternatively, at least a portion of the filter media 516 is received in the inner volume of the upper housing 512.

Figure 10A:
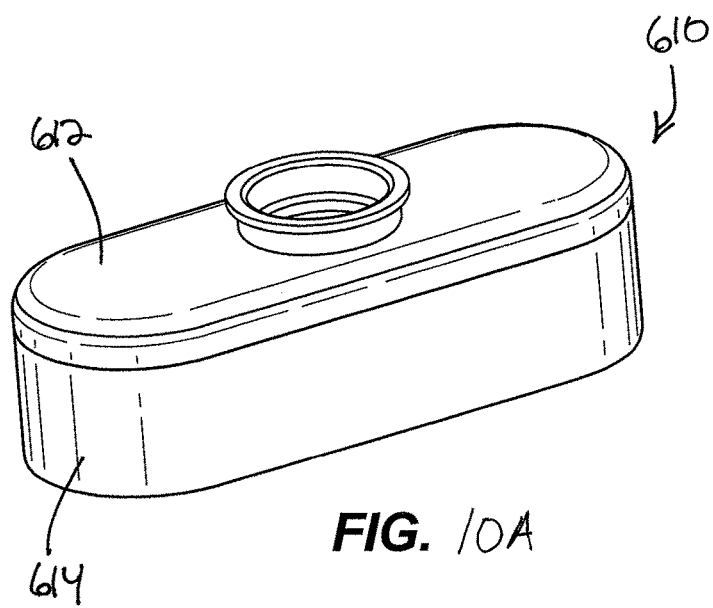
FIG. 10A is a perspective view of a filter in a collapsed position according to an embodiment of the invention.
Figure 10B:
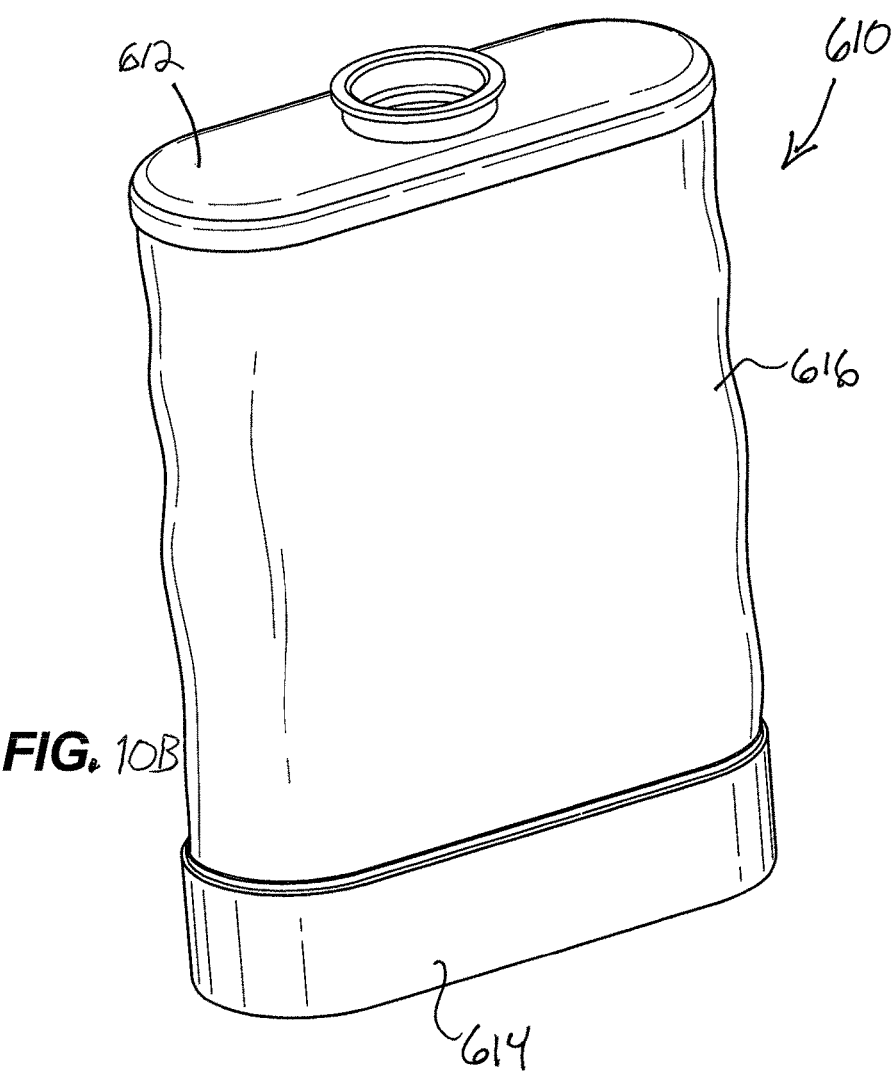
FIG. 10B is a perspective view of the filter of FIG. 10A in an expanded position.

FIGS. 10A and 10B illustrate a filter 610 according to another embodiment. The filter 610 includes features similar to the filters discussed above and only some differences between the filters will be discussed. The filter 610 includes an upper housing 612 that is generally flat and has very little, if any, inner volume. In the illustrated embodiment, in the collapsed position, the filter media 616 is virtually entirely received in the inner volume of the lower housing 614. In this embodiment, the upper housing 612 functions as a cap to close the lower housing 614 and retain the filter media 616 in the collapsed position. Alternatively, at least a portion of the filter media 616 is received in the inner volume of the lower housing 614.

Figure 11A:
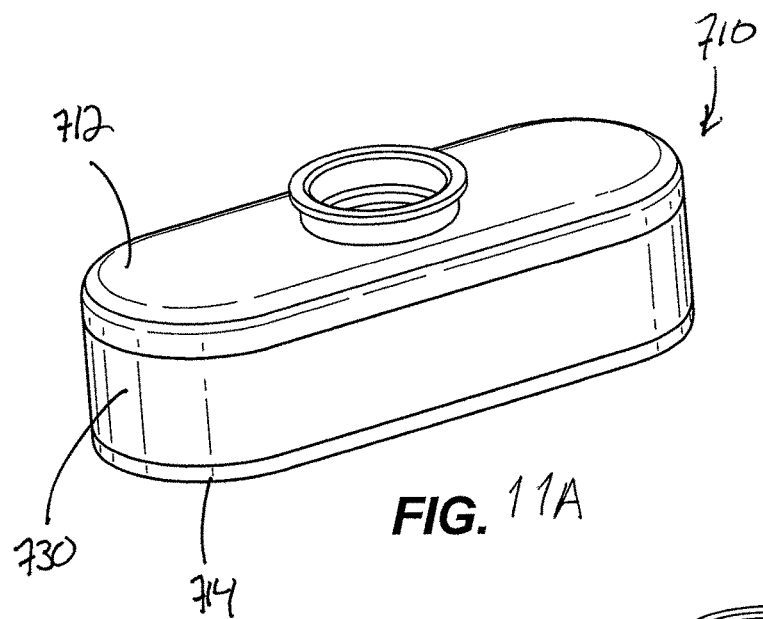
FIG. 11A is a perspective view of a filter in a collapsed position according to an embodiment of the invention.
Figure 11B:
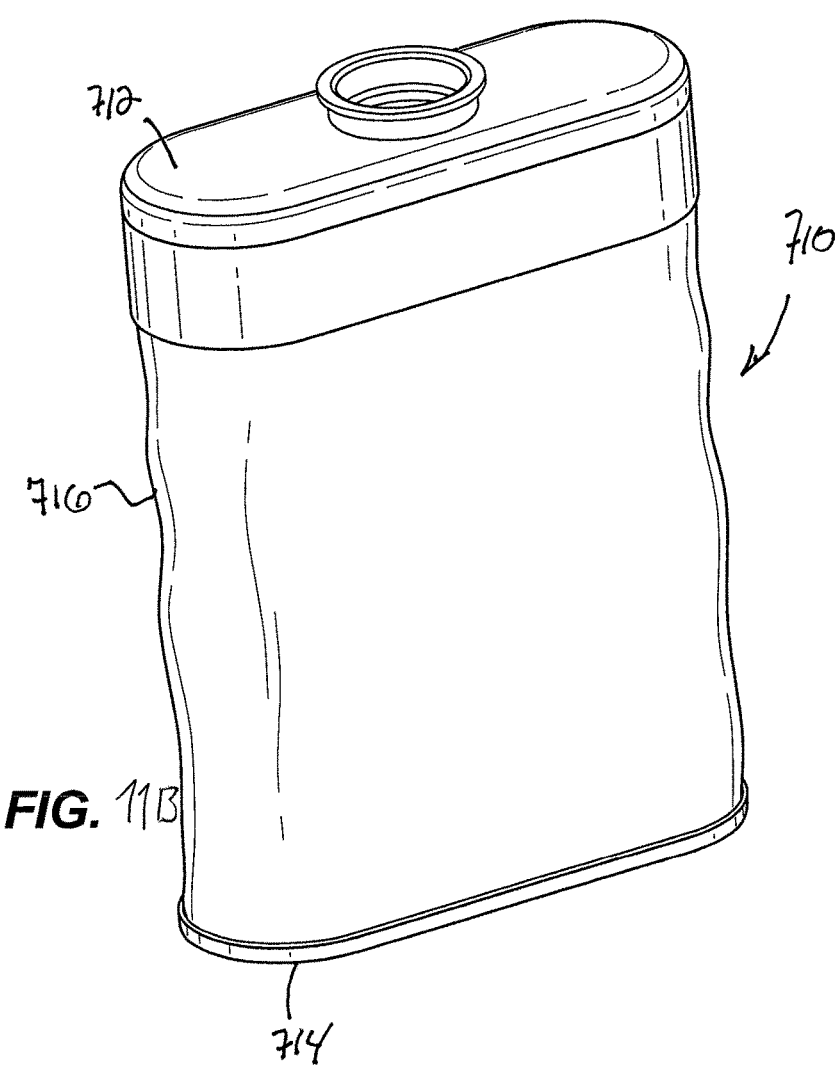
FIG. 11B is a perspective view of the filter of FIG. 11A in an expanded position.
Figure 12A:
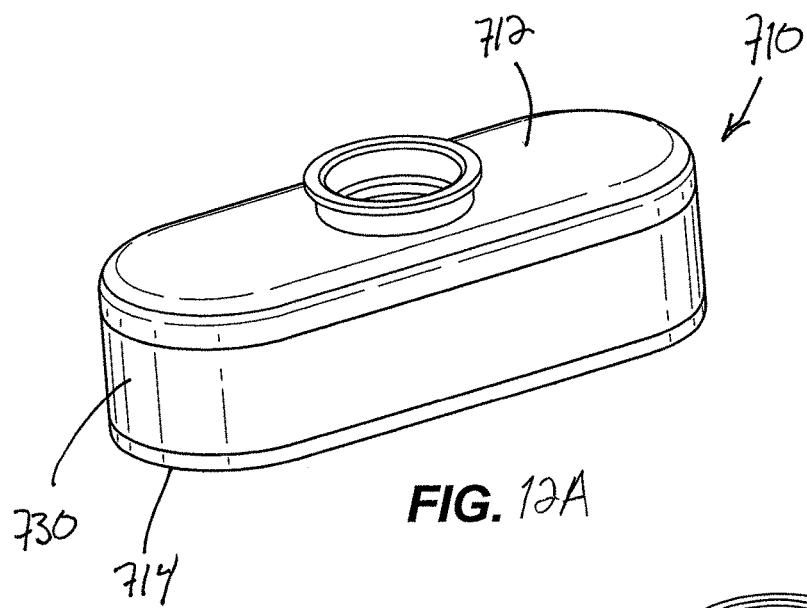
FIG. 12A is a perspective view of a filter in a collapsed position according to an embodiment of the invention.
Figure 12B:
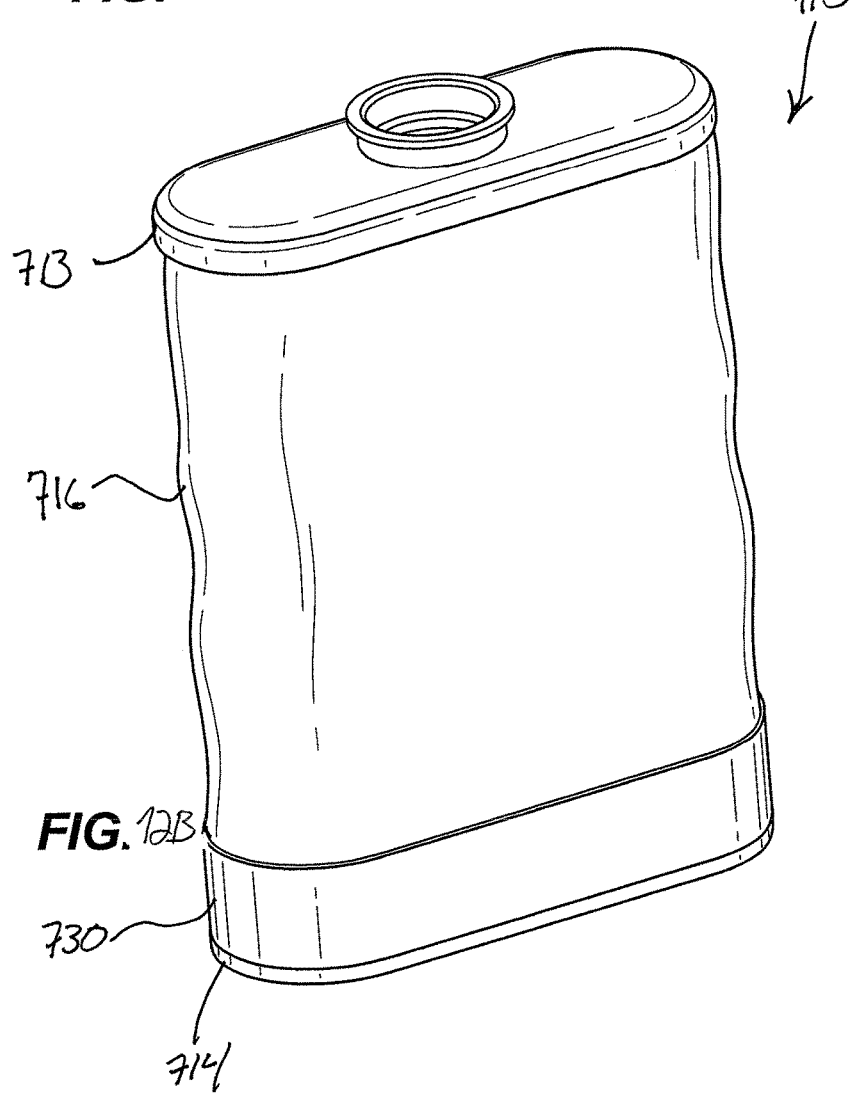
FIG. 12B is a perspective view of the filter of FIG. 12A in an expanded position.

FIGS. 11A, 11B, 12A and 12B illustrate a filter 710 according to another embodiment. The filter 710 includes features similar to the filters discussed above and only some differences between the filters will be discussed. The filter 710 includes an upper housing 712 and a lower housing 714 and either or both of the upper and lower housings may be generally flat or may have an inner volume. The filter 710 further includes an intermediate portion 730. In the illustrated embodiment, in the collapsed position, the filter media 716 is received between the housings 712, 714 and surrounded and enclosed by the intermediate portion 730. In some embodiments, the intermediate portion 730 is a tear-away style component that remains attached to either the upper housing 712 or the lower housing 714. For example, there is a perforation or similar attachment between the intermediate portion 730 and the upper housing 712 and/or lower housing 714. The perforation is torn or broken to allow the filter 710 to move to the expanded position (FIG. 11B). FIG. 11B illustrates the intermediate portion 730 remaining attached to the upper housing 712 in the expanded position. FIG. 12B illustrates the intermediate portion 730 remaining attached to the lower housing 714 in the expanded position. In yet another alternative, the intermediate portion is connected to the upper housing and/or lower housing with engaging features such as snap-fits, friction-fits, protrusions, tabs, hooks, interlocks, or other features that engage corresponding features such as recesses, openings, snap-fits, friction-fits, tabs, protrusions, hooks, interlocks, or other features to connect the intermediate portion with the adjacent housing. Engaging features between the intermediate portion and adjacent housings may be configured so that the connection to one of the adjacent housings is stronger than the connection to the other housing to control whether the intermediate portion remains with the upper housing or the lower housing when moving to the expanded position.

FIGS. 13A and 13B illustrate a filter 810 according to another embodiment. The filter 810 includes features similar to the filters discussed above and only some differences between the filters will be discussed. In the illustrated embodiment, the filter 810 includes an upper housing 812 and a lower housing 814 and either or both of the upper and lower housings may be generally flat or may have an inner volume. The filter 810 further includes an intermediate portion 830, and in the collapsed position, the filter media 816 is virtually entirely received between the housings 812, 814 and surrounded and enclosed by the intermediate portion 830. In the illustrated embodiment, the intermediate portion 830 is a tear-away style component that the user removes (as illustrated in FIG. 13A) from connection with both housings 812, 814 before using the filter 810. In some embodiment, the intermediate portion 830 can be formed by paper, film, tape, paperboard, a sleeve, or other suitable components. In one alternative, the intermediate portion and the lower housing are combined into one removable or tear-away component, with the bottom of the filter media being closed with a seam.

Figure 14A:
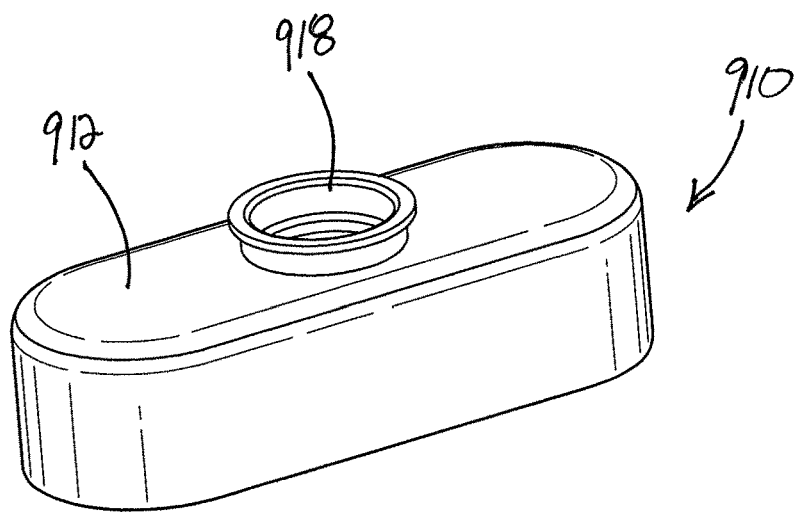
FIG. 14A is a perspective view of a filter in a collapsed position according to an embodiment of the invention.
Figure 14B:
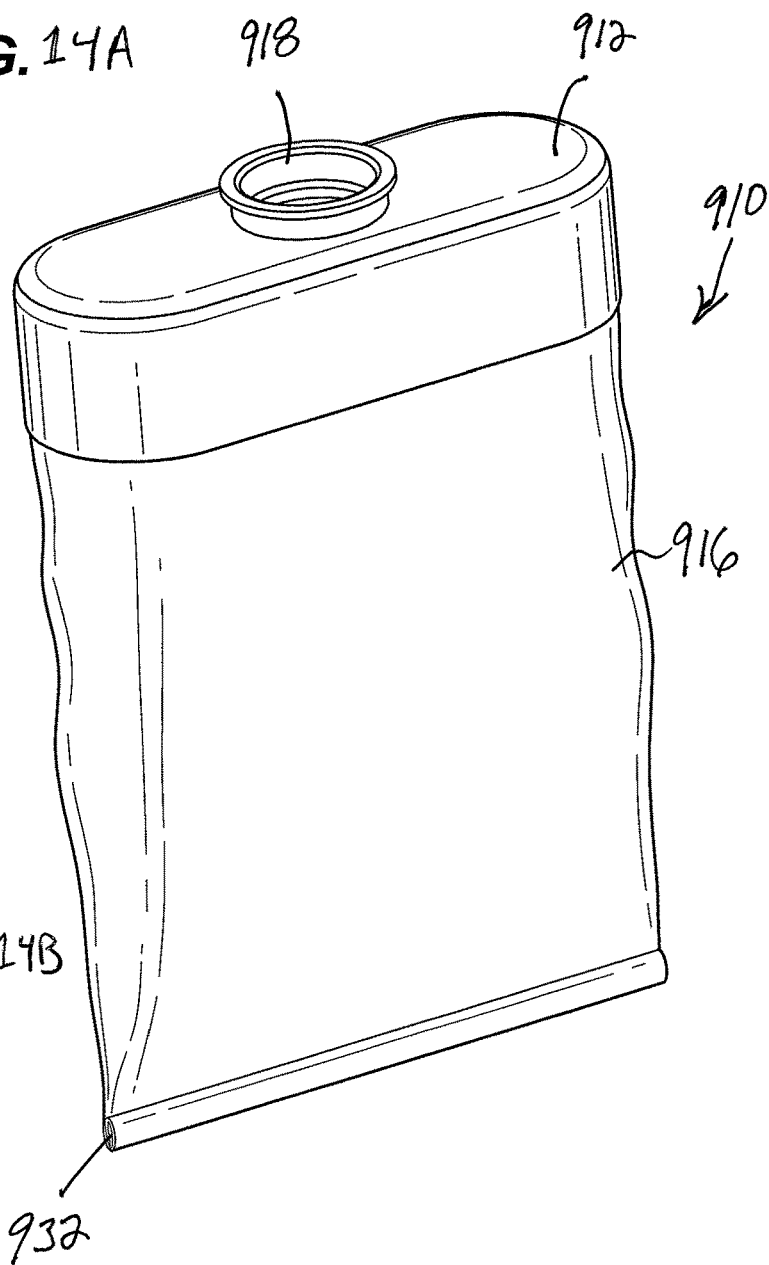
FIG. 14B is a perspective view of the filter of FIG. 14A in an expanded position.

FIGS. 14A and 14B illustrate a filter 910 according to another embodiment. The filter 910 includes features similar to the filters discussed above and only some differences between the filters will be discussed. The filter 910 includes an upper housing 912 similar to the housing 412 of the filter 410 of FIGS. 8A and 8B. The filter 910 further includes a lower end 932 of the filter media 916 that is closed with a seam, illustrated in FIG. 14B as a flat seam or rolled seam. In the collapsed position, the filter media 916 is entirely received in the inner volume of the upper housing 912. In some embodiments, the filter media 916 is enclosed in the collapsed position in the upper housing 912 by a closure device on the bottom of the upper housing 912. The closure device can include film, foil, paper, a cap, tape, bag, sleeve, or other suitable devices holding the filter media 916 and the upper housing 912 in the collapsed position. The closure device may include a perforation, slit, tear line, or hinge that allows the filter media 916 to move to the expanded position. In some embodiments, the closure device or cover would remain in place during and after installation of the filter 910 in the device. Then, the device may include a feature that automatically opens or shears the cover allowing the filter media to move to the expanded position. Alternatively or in addition, airflow from the device through the inlet opening 918 causes the filter media 916 to automatically expand and tear, push, and/or swing open the closure device, automatically expanding the filter 910. In other embodiments, the closure device may be removed, such as by peeling or tearing, by the user before or immediately after installing the filter 910.

FIGS. 15A-15C illustrate a filter 1010 according to another embodiment. The filter 1010 includes features similar to the filters discussed above and only some differences between the filters will be discussed. The filter 1010 includes an upper housing 1012 similar to the housing 412 of the filter 410 of FIGS. 8A and 8B or any other disclosed embodiment. The filter 1010 further includes a lower end of the filter media 1016 that includes a gusset bottom 1034. The gusset bottom 1034 can be formed from media material, thermoplastic molded or die cut material, film, foil, or other suitable materials. In some embodiments, the gusset bottom 1034 is air permeable. Also in some embodiments, the gusset bottom 1034 can be a self-standing type gusset. In the collapsed position, the filter media 1016 is at least partially received in the inner volume of the upper housing 1012. In some embodiments, the filter media 1016 is enclosed in the collapsed position in the upper housing 1012 by a closure device on the bottom of the upper housing 1012. The closure device can include film, foil, paper, a cap, tape, bag, sleeve, or other suitable devices holding the filter media 1016 and the upper housing 1012 in the collapsed position. The closure device may include a perforation 1069, slit, tear line, or hinge that allows the filter media 1016 to move to the expanded position. In some embodiments, the closure device or cover would remain in place during and after installation of the filter 1010 in the device. Then, the device may include a feature that automatically opens or shears the cover. Alternatively or in addition, airflow from the device through the inlet opening 1018 causes the filter media 1016 to automatically expand and tear, push, and/or swing open the closure device, automatically expanding the filter 1010. In other embodiments, the closure device may be removed, such as by peeling or tearing, by the user before or immediately after installing the filter 1010.

Figure 16B:
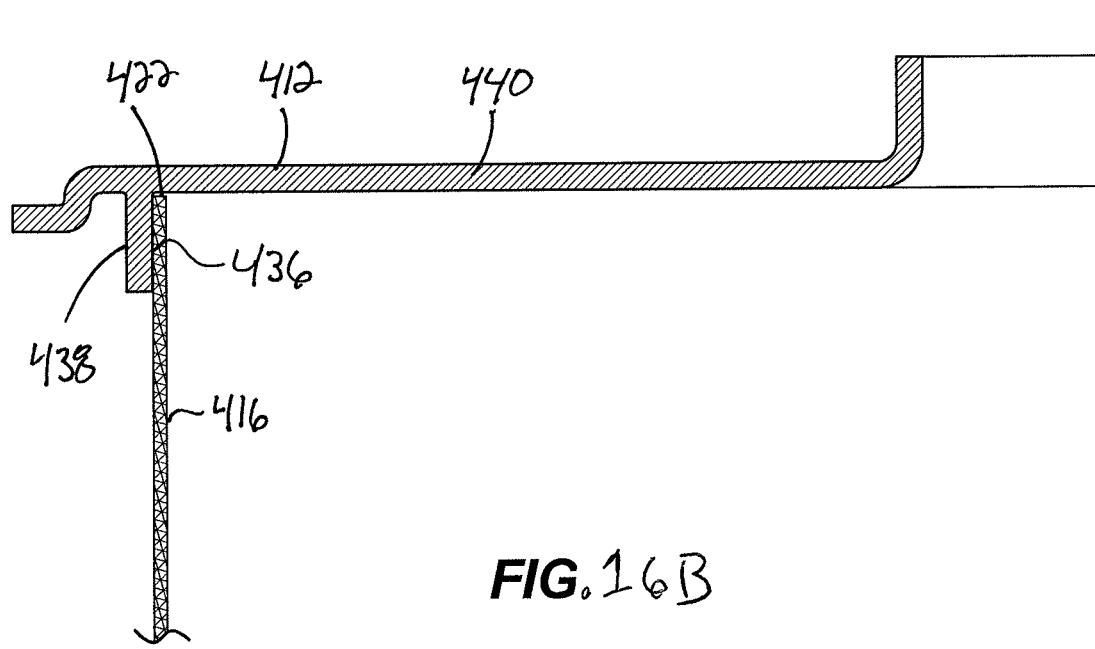
FIG. 16B is a cross-sectional view of a filter according to an embodiment of the invention.

FIG. 16A illustrates one possible way to attach the filter media 416 to the upper housing 412 (or any of the upper housings described herein). In the embodiment of FIG. 16A, the filter media 416 is welded onto an inside surface 436 of a sidewall 438 of the upper housing 412 at the first end 422 of the filter media 416. The media 416 can also be attached to the housing 412 using adhesive. In other embodiments, including when the upper housing 412 is formed from thermoplastic, the housing 412 may be overmolded onto the filter media 416. FIG. 16B illustrates the attachment described above with regard to FIG. 16A except that the housing 412 has a different shaped sidewall 438 and the end 422 of the filter media 416 abuts a top wall 440 of the housing 412. In the embodiments illustrated in FIGS. 16A and 16B, the attachment is generally radial or transverse to the direction of the filter media, with a mandrel, horn, or other attachment process support being provided through the lower end of the filter prior to the lower end being closed.

Figure 17A:
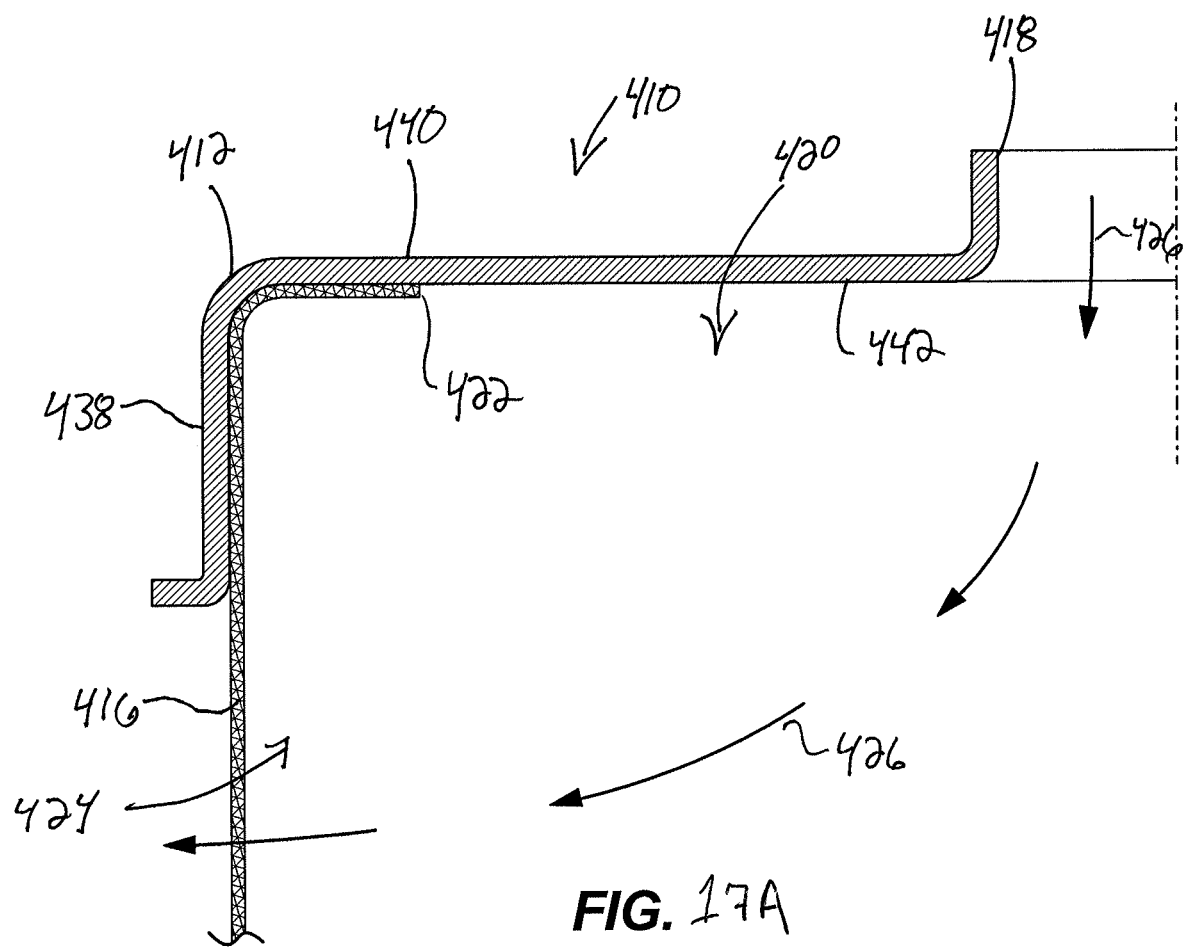
FIG. 17A is a cross-sectional view of a filter according to an embodiment of the invention.
Figure 17B:
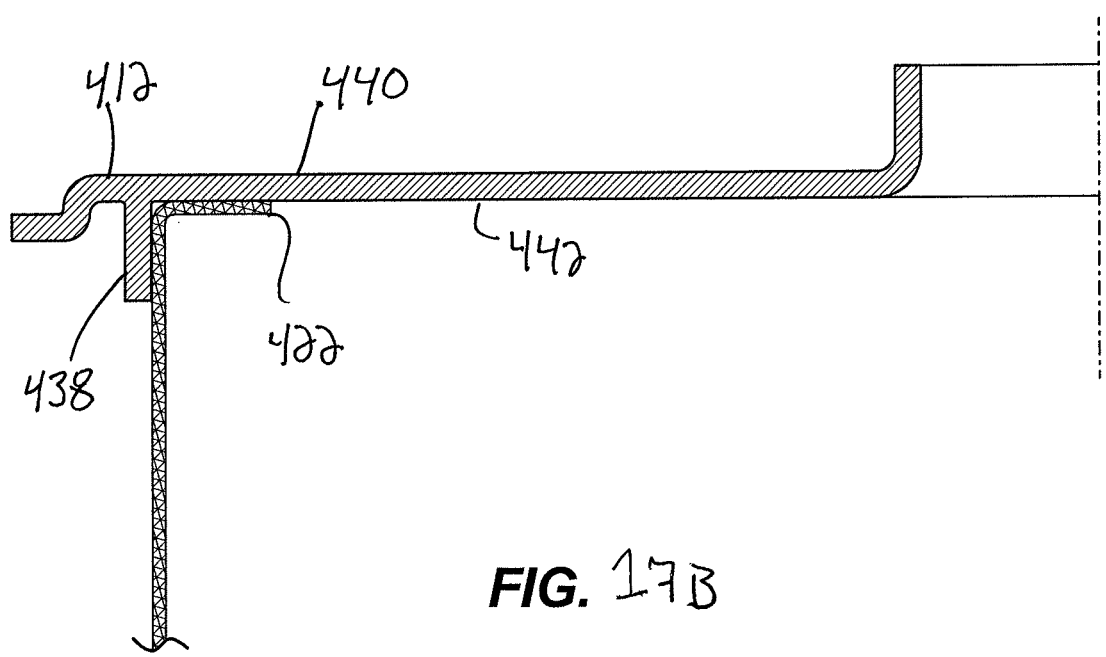
FIG. 17B is a cross-sectional view of a filter according to an embodiment of the invention.

FIG. 17A illustrates another possible way to attach the filter media 416 to the upper housing 412 (or any of the upper housings described herein). In the embodiment of FIG. 17A, the filter media 416 is welded onto an inside surface 442 of the top wall 440 of the upper housing 412 at the first end 422 of the filter media 416. Alternatively, the media 416 can be attached to the housing 412 using adhesive. In other embodiments, not shown, when the upper housing 412 is formed from thermoplastic, the housing 412 may be overmolded onto the filter media 416. FIG. 27B illustrates the attachment described above with regard to FIG. 17A except that the housing 412 has a different shaped sidewall 438. In the embodiments illustrated in FIGS. 17A and 17B, the attachment is generally axial or along the direction of the filter media, with a mandrel, horn, or other attachment process support being provided through the lower end of the filter prior to the lower end being closed.

Figure 18C:
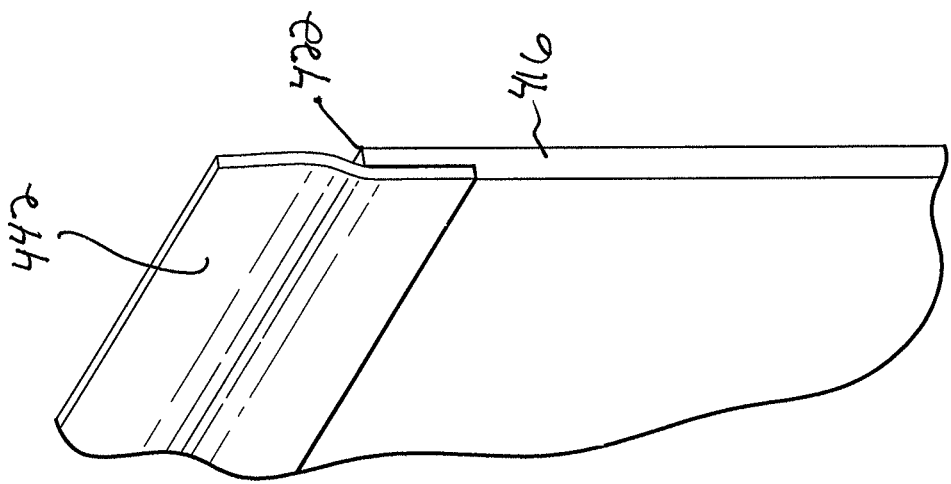
FIG. 18C is a perspective view of filter media for use in a filter embodying the invention.
Figure 18B:
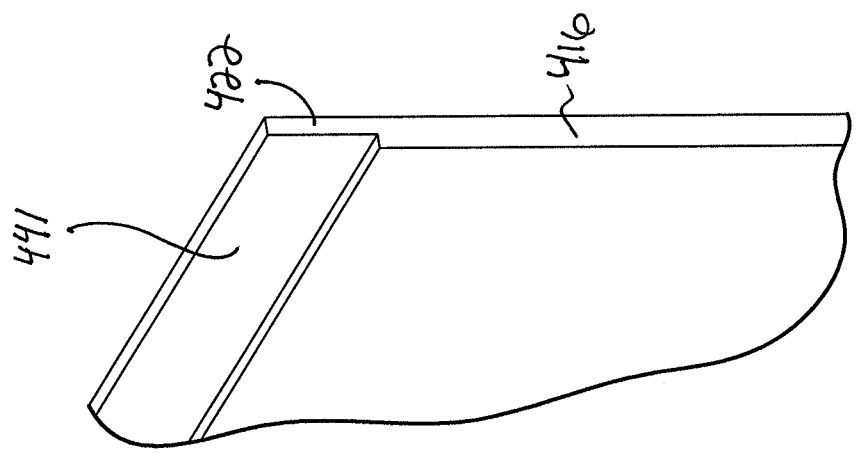
FIG. 18B is a perspective view of filter media for use in a filter embodying the invention.
Figure 18A:
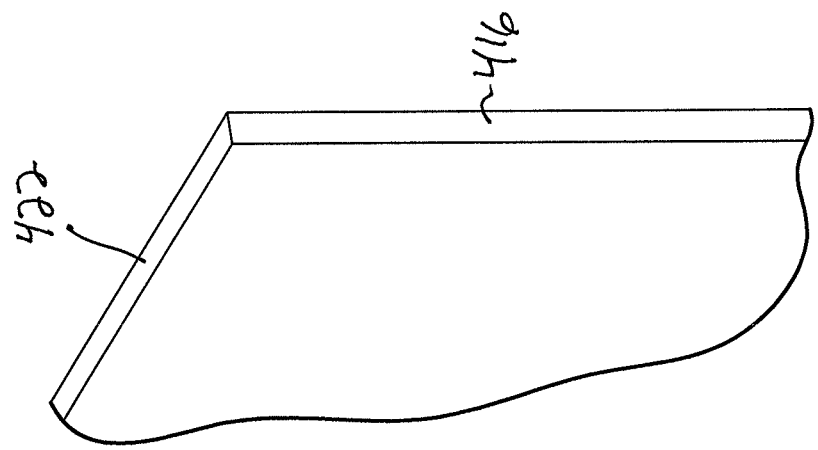
FIG. 18A is a perspective view of filter media for use in a filter embodying the invention.

FIGS. 18A-18C illustrate how the first end 422 of the filter media 416 may be prepared before attaching the filter media 416 to the housing 412 (similarly, how the second end of the filter media 416 could be prepared before attachment to the lower housing 414). FIG. 18A illustrates the first end 422 of the filter media 416 in its original thickness and the first end 422 can be attached to the housing 412 in its original thickness. Alternatively, as illustrated in FIG. 18B, the filter media 416 can be compressed along the first end 422 to create an area 441 of reduced thickness and increased density. The area 441 of reduced thickness is where the welding or overmolding to the housing 412 will be made. FIG. 18C illustrates another embodiment where a secondary strip of material 442 is welded other otherwise attached to the end 422 of the filter media 416. Then, the secondary strip of material 442 is welded, overmolded, or otherwise attached to the housing 412. In some embodiments, the secondary strip of material 442 includes a film and/or extrusion and can be applied to one or both sides of the filter media 416.

Figure 20:
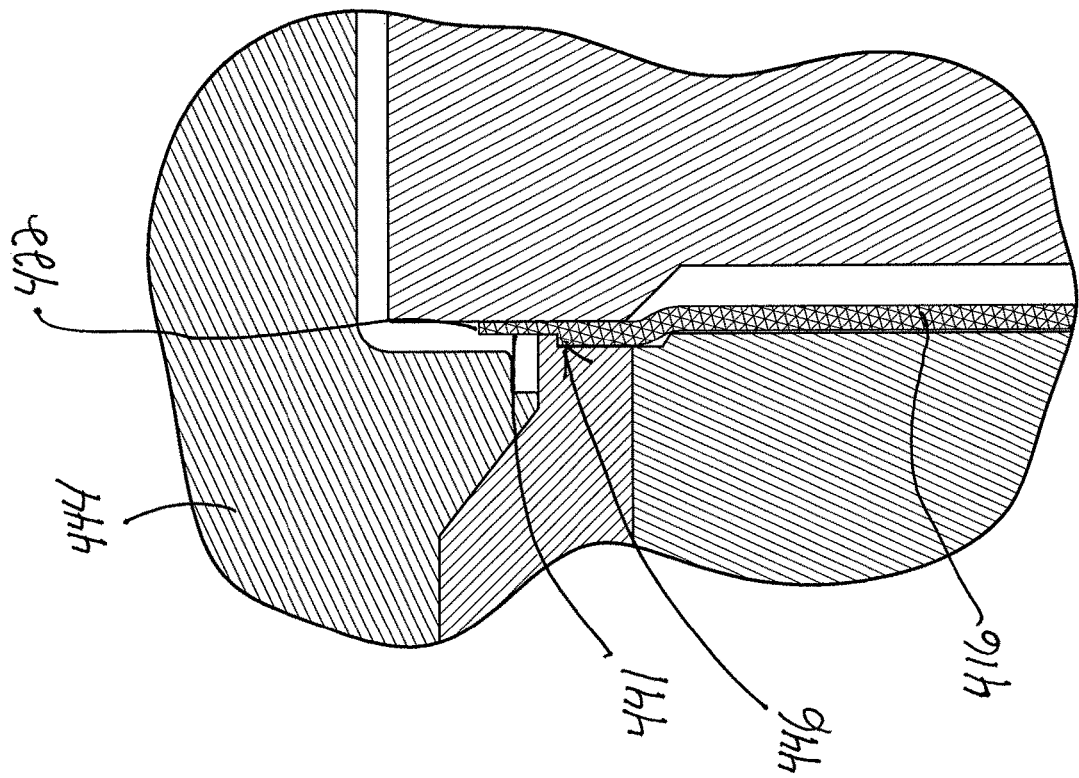
FIG. 20 is a cross-sectional view further illustrating the method of FIG. 19.
Figure 19:
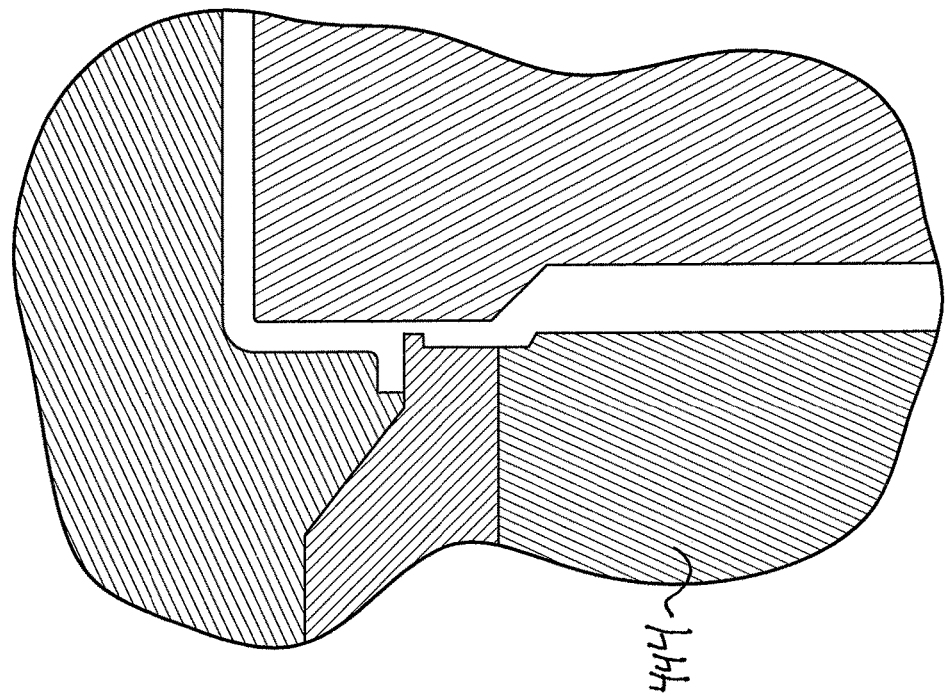
FIG. 19 is a cross-sectional view illustrating a method of manufacturing a filter embodying the invention.

FIGS. 19 and 20 illustrate one possible method of attaching the housings 412, 414 (or other housings discussed herein) onto the filter media 416 by overmolding. As shown in FIG. 20, the filter media 416 is placed into the mold 444 over the mold core being provided through the lower end of the filter prior to the lower end being closed. Then, the material of the housings 412, 414 is injected over the filter media 416. In the illustrated method of FIG. 20, the filter media 416 having the reduced thickness 441 at the end 422 is utilized. The mold 444 shuts off or closes against the media 416 at the area 441 of reduced thickness (near area of arrow 446 in FIG. 20). The injected material adheres to the filter media 416 along the area of reduced thickness 441 to attach the filter media 416 to the housings 412, 414. In various alternatives, filter media having end treatment shown in FIGS. 18A, 18B, and 18C may be utilized.

In another alternative, as discussed with reference to FIG. 8C, the filter media 416 may be divided into at least two portions, with the first portion of the filter media 416 being attached to the upper housing 412. Attaching a smaller portion of media to the upper may be useful in handing the filter media in a welding or molding process where internal support is needed. Then, after attachment of the first portion to the upper housing, the second piece of filter media 416' is attached to the first portion of filter media 416 using traditional bonding, sewing, or welding techniques. In one embodiment, not shown, the panel 428 is attached directly to the upper housing by welding, overmolding, adhesive, or other technique, and the filter media 416 is attached to the panel.

Figure 21A:
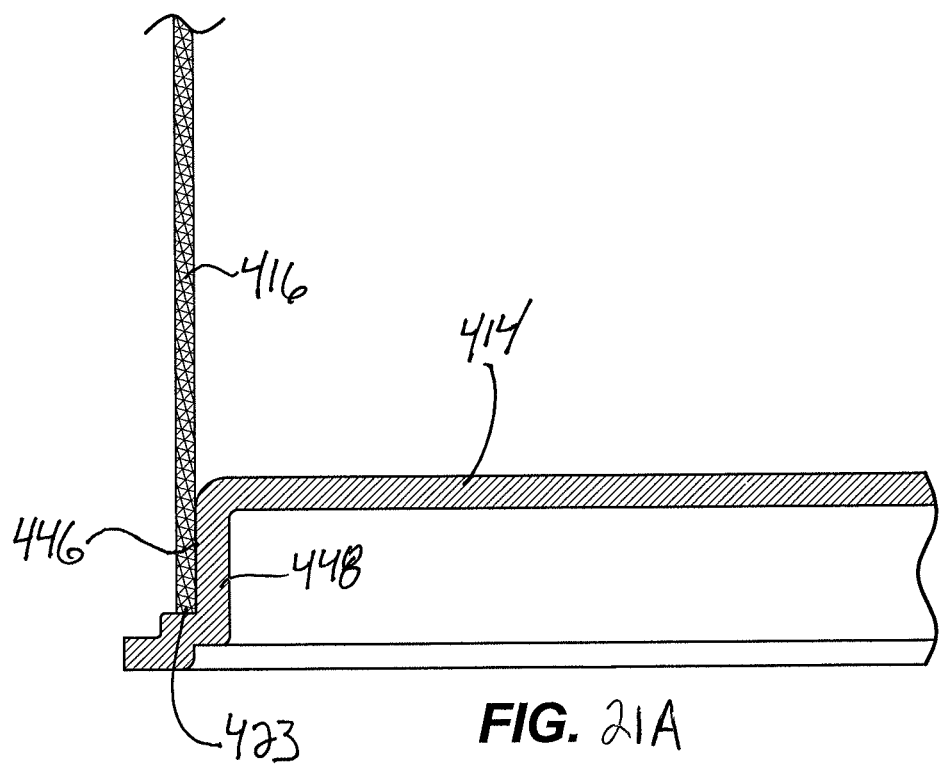
FIG. 21A is a cross-sectional view of a filter according to an embodiment of the invention.
Figure 21B:
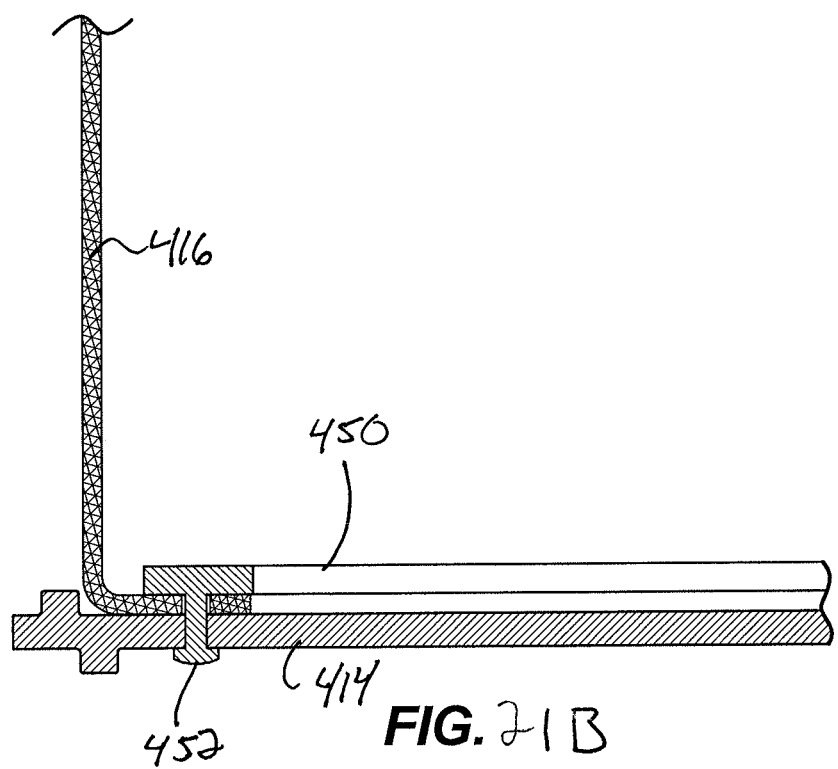
FIG. 21B is a cross-sectional view of a filter according to an embodiment of the invention.

FIG. 21A illustrates a possible way to attach the filter media 416 to the lower housing 414 (or any of the lower housings described herein). In the embodiment of FIG. 21A, the filter media 416 is welded onto an outside surface 446 of a sidewall 448 of the lower housing 414 at the second end 423 of the filter media 416. The filter media 416 can also be attached to the housing 414 using adhesive. FIG. 21B illustrates one possible way to attach the filter media 316 to a flat lower housing 314 (similarly could be used to attach to a flat upper housing 412 or any of the housings described above). A ring 450 optionally having projections 452 may be fitted to capture the lower end of the filter media 416 between the ring and the housing 414 and may be heat staked or otherwise fastened to attach the filter media 416 and the housing 414.

Figure 22:
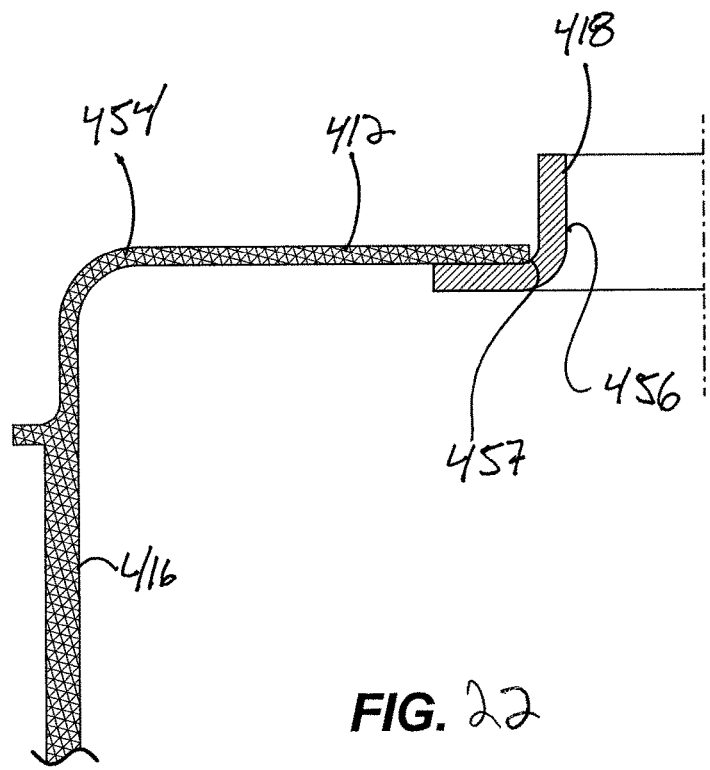
FIG. 22 is a cross-sectional view of a filter according to an embodiment of the invention.

FIG. 22 illustrates an alternative embodiment where a portion 454 of the upper housing 412 is formed by the filter media 416, generally by making the filter media 416 in the portion 454 more rigid or stiffer than the other areas of the filter media 416. The portion 454 is stiffened by compression molding, vacuum thermoforming, or a combination of both, and/or coating/impregnating the portion 454 with thermoset, thermoplastic, or other material to make a rigid or semi rigid upper portion having a desired shape made with the filter media 416. An inlet piece 456, including the inlet opening 418, is inserted through an aperture 457 of the portion 454. The inlet piece 456 can be attached by welding or adhesive. In the illustrated embodiment, the inlet piece 456 is attached to the inside of the portion 454 and in other embodiments, the inlet piece 456 may be attached to the outside of the portion 454. In another embodiment, the inlet piece is overmolded onto the filter media before, during, or after the stiffening operation.

Figure 23:
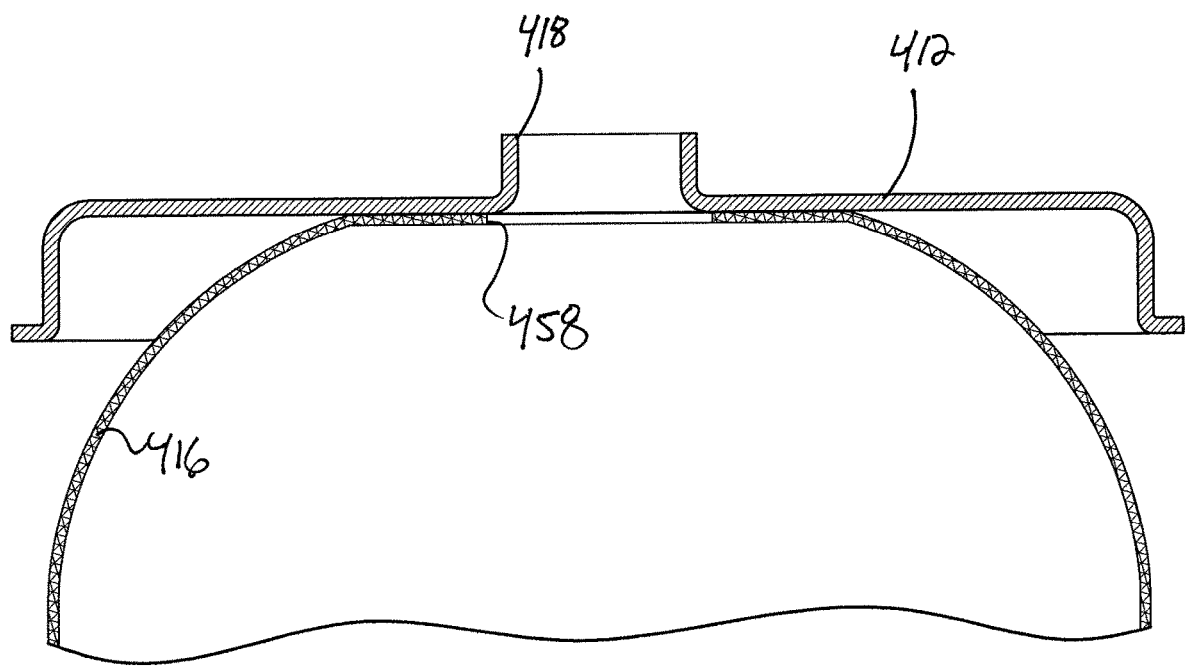
FIG. 23 is a cross-sectional view of a filter according to an embodiment of the invention.

FIG. 23 illustrates an alternative embodiment where the filter media 416 is formed with a generally closed end except for aperture 458. Then, the filter media 416 is attached to the housing 412 with the aperture 458 aligned with the inlet opening 418. The attachment could be made by welding or adhesive around the aperture 458.

Figure 24:
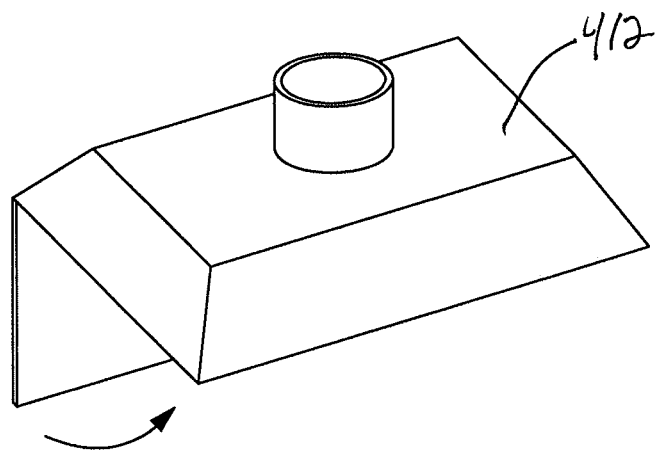
FIG. 24 is a perspective view of a housing for use in a filter embodying the invention.
Figure 25:
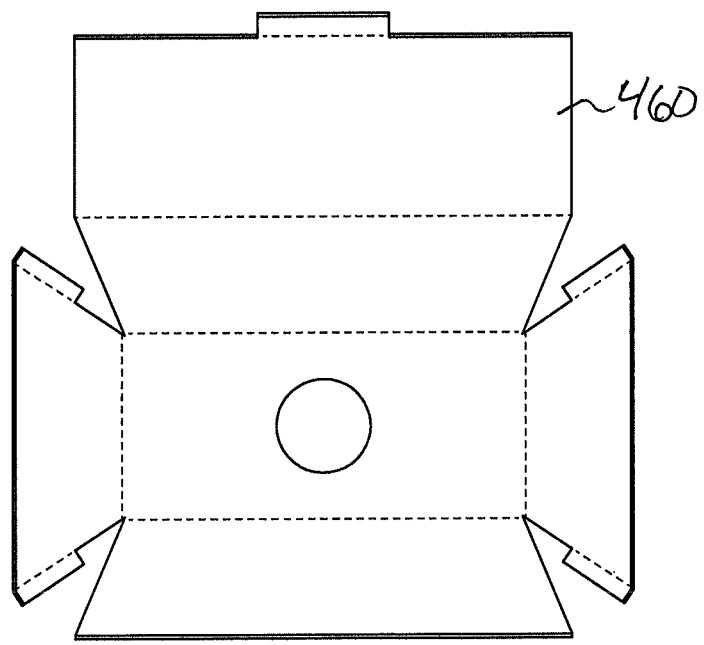
FIG. 25 is a bottom side view of the housing of FIG. 24 before the housing is formed into the position illustrated in FIG. 24.

FIGS. 24 and 25 illustrate an alternative embodiment where the housing 412 or housing 414 are formed by folding a die cut shape 460 (FIG. 25). The shape 460 is die cut and then folded to create the housing 412 or 414. The filter media can be attached to the housings 412 or 414 by welding or adhesive. In other embodiments, the housing can be formed from a single piece hinged from a top piece. The top and bottom die cut pieces could be separated and then bonded to each other or separately to the filter media by the methods previously discussed.

Figure 26:
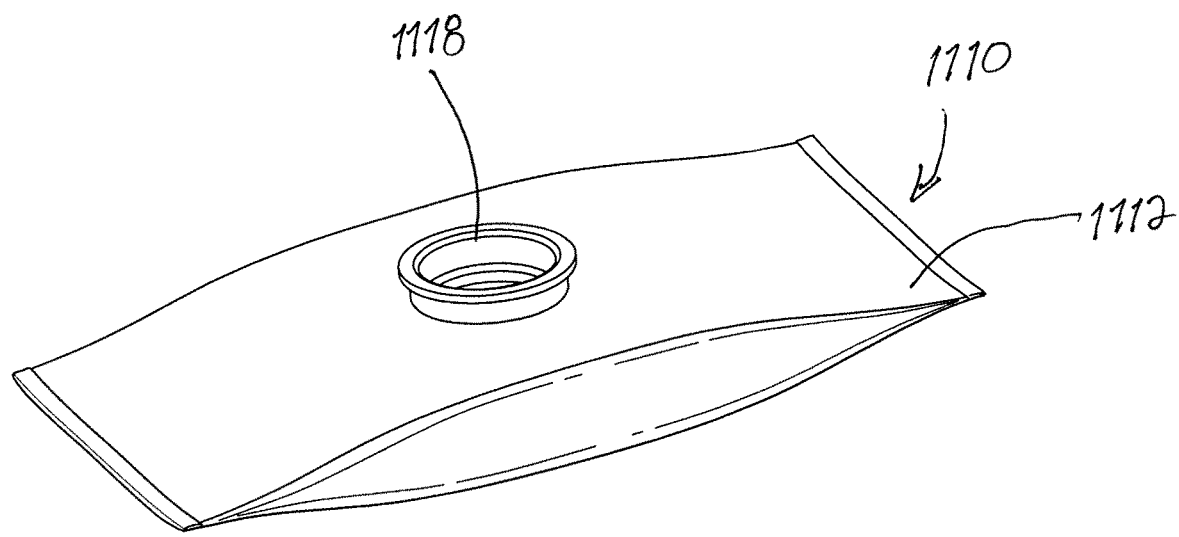
FIG. 26 is a perspective view of a filter according to an embodiment of the invention with the filter media in a collapsed position.
Figure 27:
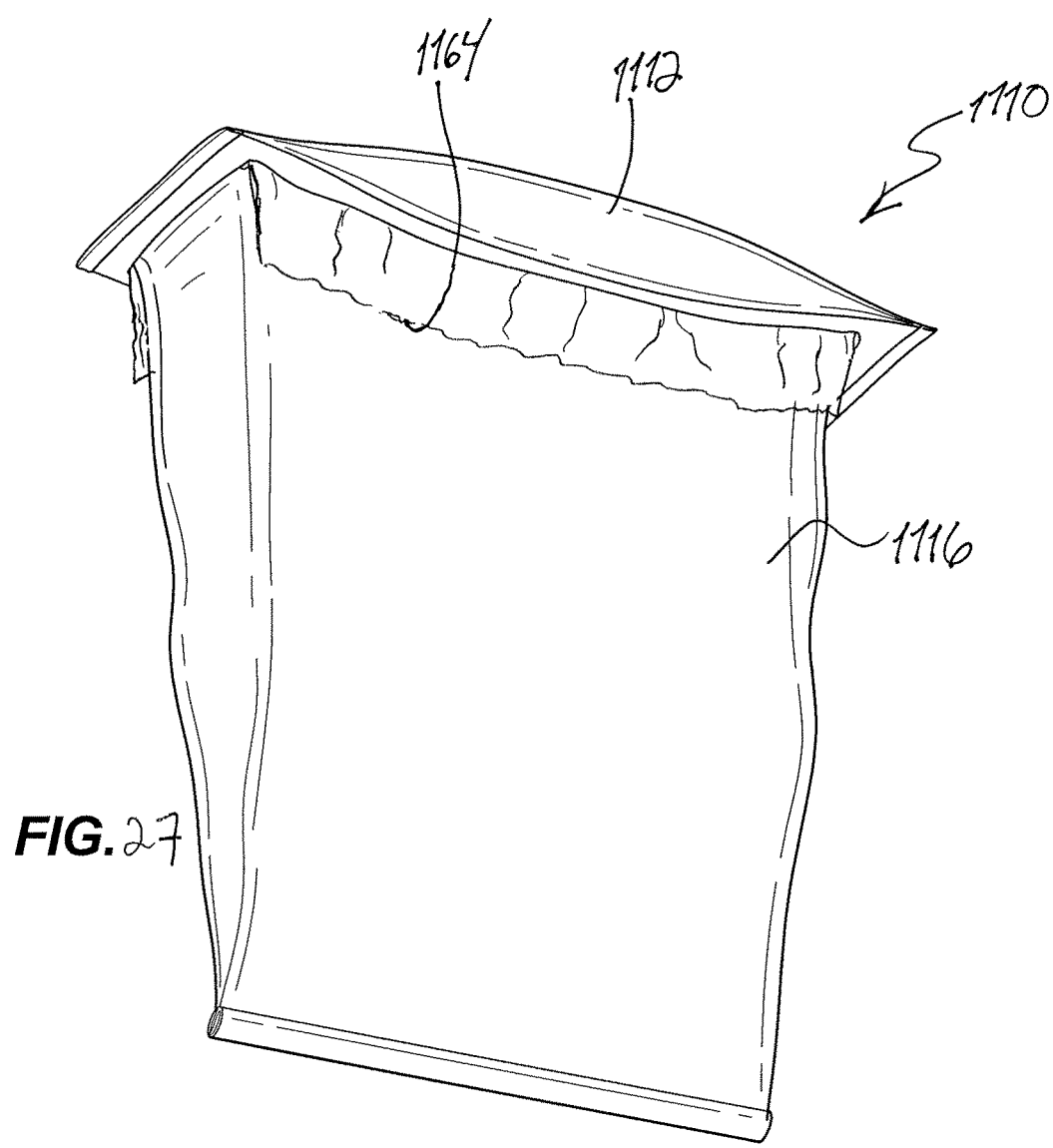
FIG. 27 is a perspective view of the filter of FIG. 26 illustrating the filter media in an expanded position.

FIGS. 26 and 27 illustrate a filter 1110 according to another embodiment. The filter 1110 includes features similar to the filters discussed above and only some differences between the filters will be discussed. The filter 1110 includes an upper housing 1112 that includes a bag 112. In one embodiment, filter media 1116 is formed as a complete enclosure with a desired inlet 1118. The filter media is compacted and inserted into an open end of the bag 1112 and then the bag sealed, or alternatively, the bag 1112 formed and sealed around the compacted media. Optionally, the bag 1112 is attached to the filter material around the inlet 1118. The bag 1112 can be formed from foil, plastic, paper, or other suitable materials. The bag 1112 includes a tear-out bottom 1164 opposite the inlet 1118 at the top of the bag 1112. In some applications, the bag 1112 is installed into the device with the filter media 1116 in the collapsed position (FIG. 26). Then, when the device is used or turned on, the filter media 1116 automatically breaks through the bottom 1164 of the bag 1112 because of the airflow through the inlet 1118. Alternatively, the bag includes a portion that the user opens before loading into a device, such as a tear-away portion, tear or cut line, or other opening. In yet another alternative, a mechanism may be used to push or pull one end of the filter away from the other moving the filter to the expanded position.

Although the invention has been described in detail with reference to certain preferred embodiments, variations and modifications exist within the scope and spirit of one or more independent aspects of the invention as described.

What is claimed is:

1. A filter configured to separate debris from a flow of fluid, the filter comprising:
   a housing having a first inner volume;
   a filter media having a first end, a second end, and a second inner volume between the first and second ends, the filter media coupled to the housing at the first end of the filter media such that the first and second inner volumes together at least partially define a collection container configured to store the debris separated by the filter media from the flow of fluid; and
   an inlet opening that extends through the housing to provide fluid communication into the collection container such that the flow of fluid with debris can flow into the collection container and a relatively clean flow of fluid exits through the filter media between the first and second ends of the filter media, and
   wherein the filter media is collapsible into the first inner volume of the housing.,
   wherein the housing is a first housing, the filter further comprising a second housing that defines a third inner volume, wherein the filter media is coupled to the second housing at the second end of the filter media, wherein the second housing and the first housing enclose the filter media when the filter media is collapsed into the first housing, and
   wherein, the first inner volume of the filter media, along with the second inner volume of the first housing, and the third inner volume of the second housing together define a collection container that stores debris separated by the filter media.

2. The filter of claim 1, the filter further comprising:
   an attachment member that couples the filter media to the first housing.

3. The filter of claim 2, wherein the first housing includes a groove that receives the attachment member to couple the filter media to the first housing.

4. The filter of claim 3, wherein the groove is formed with an inner wall and an outer wall, where the height of the outer wall is greater than the inner wall.

5. The filter of claim 3, wherein the filter media is disposed between the groove and the attachment member, thereby coupling the filter media to the first housing.

6. The filter of claim 5, wherein the filter media is folded over the attachment member such that an end of the filter media extends away from the first housing a desired length forming an overlapping filter media section.

7. The filter of claim 6, further comprising one or more extension members positioned in a location to direct the overlapping filter media section to extend in a direction along an outer wall of the filter.

8. The filter of claim 5, wherein the attachment member and the filter media are press-fit into the groove.

9. The filter of claim 5, wherein the attachment member and the filter media are fastened into the groove.

10. The filter of claim 2, wherein the first housing is formed from a plastic material.

11. The filter of claim 2, wherein the second housing includes a groove that receives a portion of the filter media, wherein a second attachment member is received within the groove of the second housing to couple the second end of the filter media to the second housing.

12. The filter of claim 11, wherein the groove of the second housing is formed with an inner wall and an outer wall, where the height of the outer wall is greater than the inner wall.

13. The filter of claim 11, wherein one or both of the attachment member and the second attachment member includes a fixturing recess or protrusion.

14. The filter of claim 1, the filter further comprising:
   an attachment member coupling the filter media to the first housing at least partially forming the collection container, wherein
   the first end of the filter media being folded such that at least a portion of the first end extends away from the housing forming an overlapping filter media section.

15. The filter of claim 14, wherein the flow of fluid flows in a direction toward the overlapping filter media section.

16. The filter of claim 14, wherein the filter media is folded over the attachment member forming the overlapping filter media section.

17. The filter of claim 14, wherein the first housing includes a groove that receives the attachment member to couple the filter media to the housing.

18. The filter of claim 14, wherein the filter media forms a perimeter, and the overlapping filter media section extends along one or more portions of the perimeter of the filter media.

19. The filter of claim 14, wherein the filter media forms a perimeter, and the overlapping filter media section extends around the perimeter of the filter media.

20. The filter of claim 14, wherein the second end of the filter media is folded such that at least a portion of the second end extends away from the second housing forming a second overlapping filter media section.

21. The filter of claim 18, wherein the second housing includes a groove that receives the attachment member to couple the filter media to the second housing.

22. The filter of claim 1, further comprising a valve in the inlet opening, the valve movable between an opened position and a closed position.

23. The filter of claim 1, wherein the filter media includes a seam that extends from the first end to the second end of the filter media, the filter further comprising a panel that extends along the seam.

24. The filter of claim 23, wherein the panel is transparent.

25. The filter of claim 1, wherein the first housing is formed from a plastic material.

26. The filter of claim 1, where the second housing is coupled to the first housing when the filter media is collapsed into the first housing.

27. The filter of claim 1, wherein the first end of the filter media is welded to the first housing.

28. The filter of claim 1, wherein the first housing is overmolded onto the first end of the filter media.

29. The filter of claim 1, wherein the first end of the filter media is attached to the first housing by adhesive.

30. A filter configured to separate debris from a flow of fluid, the filter comprising:
a first housing;
a second housing having a first inner volume;
a filter media having a first end, a second end, and a second inner volume between the first and second ends, the filter media coupled to the first housing at the first end of the filter media and the filter media coupled to the second housing at the second end of the filter media such that the first and second inner volumes together at least partially define a collection container configured to store the debris separated by the filter media; and
an inlet opening that extends through the first housing to provide fluid communication into the collection container such that the flow of fluid with debris can flow into the collection container and a relatively clean flow of fluid exits through the filter media between the first and second ends of the filter media, and
wherein the filter media is collapsible into the first inner volume of the second housing.

31. The filter of claim 30, wherein the second housing and the first housing enclose the filter media when the filter media is collapsed into the second housing.

32. The filter of claim 30, where the second housing is coupled to the first housing when the filter media is collapsed into the second housing.

33. The filter of claim 30, where the first housing has a third inner volume, wherein the filter media is collapsible into the third inner volume of the first housing.

34. A filter configured to separate debris from a flow of fluid, the filter comprising:
a first housing;
a second housing;
a filter media having a first end, a second end, and an inner volume between the first and second ends, the filter media coupled to the first housing at the first end of the filter media and the filter media coupled to the second housing at the second end of the filter media such that the first and second housings and the inner volume of the filter media together at least partially define a collection container configured to store the debris separated by the filter media; and
an inlet opening that extends through the first housing to provide fluid communication into the collection container such that the flow of fluid with debris can flow into the collection container and a relatively clean flow of fluid exits through the filter media between the first and second ends of the filter media, and
wherein the filter media is collapsible between the first and second housing in a collapsed position and the filter media is movable to an expanded position.

35. The filter of claim 34, further comprising an intermediate portion between the first and second housings that holds the filter media in the collapsed position.

36. The filter of claim 35, wherein the intermediate portion and the first and second housings enclose the filter media in the collapsed position.

37. The filter of claim 35, wherein the intermediate portion is removably coupled to at least one of the first and second housing to allow the filter media to move to the expanded position.

38. The filter of claim 34, where the first and second housings enclose the filter media in the collapsed position.

39. The filter of claim 34, where the filter media is collapsible into the first housing, the second housing, or a combination of both in the collapsed position.

* * * * *